(12) United States Patent
Dames et al.

(10) Patent No.: US 12,092,117 B2
(45) Date of Patent: Sep. 17, 2024

(54) CENTRIFUGAL PUMP UNIT

(71) Applicant: XYLEM EUROPE GMBH

(72) Inventors: Andrew Dames, Cambridge (GB);
Vincenzo Piazza, Newmarket (GB);
Mathew Price, Cambridge (GB);
Hilary Meanwell, Saffron Walden (GB); Michael Cantor, Cambridge (GB)

(73) Assignee: XYLEM EUROPE GMBH, Cambridge (GB)

( * ) Notice: Subject to any disclaimer, the term of this patent is extended or adjusted under 35 U.S.C. 154(b) by 96 days.

(21) Appl. No.: 17/275,313

(22) PCT Filed: Sep. 10, 2019

(86) PCT No.: PCT/GB2019/052519
§ 371 (c)(1),
(2) Date: Mar. 11, 2021

(87) PCT Pub. No.: WO2020/053572
PCT Pub. Date: Mar. 19, 2020

(65) Prior Publication Data
US 2022/0049703 A1   Feb. 17, 2022

(30) Foreign Application Priority Data

Sep. 11, 2018  (GB) ................................. 1814762

(51) Int. Cl.
*F04D 15/00* (2006.01)
*F04D 29/24* (2006.01)
(Continued)

(52) U.S. Cl.
CPC ......... *F04D 15/0088* (2013.01); *F04D 29/24* (2013.01); *F04D 29/426* (2013.01); *G01F 1/36* (2013.01); *F04D 15/0066* (2013.01)

(58) Field of Classification Search
CPC .... F04D 15/0088; F04D 29/24; F04D 29/246; F04D 15/0066; G01F 1/36
See application file for complete search history.

(56) References Cited

U.S. PATENT DOCUMENTS 5,129,264 A  7/1992 Lorenc
5,704,767 A * 1/1998 Johnson .................... G01F 3/10
                                               418/2

(Continued)

FOREIGN PATENT DOCUMENTS

CN        87207370 U    3/1988
CN        2602349 Y     2/2004
(Continued)

OTHER PUBLICATIONS

Bibliographic Data, including English Abstract, Document KR101863029B1, 2 pages.
(Continued)

*Primary Examiner* — Connor J Tremarche
(74) *Attorney, Agent, or Firm* — Ware, Fressola, Maguire & Barber LLP

(57) ABSTRACT

A centrifugal pump unit (1) is disclosed having a body (4) that includes a suction connection (5), a pressure connection (6) and a pump chamber (7) connecting the suction and pressure connections. The centrifugal pump unit further includes an impeller (8) disposed in the pump chamber and at least one electromagnetic flow sensor (3) arranged to measure flow in at least a part of the suction connection and/or pressure connection and/or pump chamber for determining a flow rate of a fluid through the centrifugal pump unit or for determining a control signal equivalent of the flow rate for control purposes.

19 Claims, 22 Drawing Sheets

(51) Int. Cl.
*F04D 29/42* (2006.01)
*G01F 1/36* (2006.01)

(56) References Cited

U.S. PATENT DOCUMENTS

| | | | |
|---|---|---|---|
| 8,858,170 B2* | 10/2014 | Pedersen | F04D 29/4273 415/203 |
| 2001/0041139 A1* | 11/2001 | Sabini | F04D 15/0066 417/18 |
| 2005/0075803 A1* | 4/2005 | Budmiger | G01F 1/60 702/45 |
| 2008/0317608 A1* | 12/2008 | Gray | F04D 15/0209 417/43 |
| 2010/0243086 A1* | 9/2010 | Gilpatrick | B05B 12/085 137/565.01 |
| 2017/0115150 A1* | 4/2017 | Ikeuchi | G01F 1/6842 |
| 2018/0216978 A1* | 8/2018 | Dames | G01F 15/14 |

FOREIGN PATENT DOCUMENTS

| | | |
|---|---|---|
| CN | 104641118 A | 5/2015 |
| CN | 105928573 A | 9/2016 |
| DE | 10 2016 009 179 A1 | 2/2019 |
| EP | 0 774 583 B1 | 9/2000 |
| EP | 2 872 781 B1 | 12/2017 |
| KR | 101863029 B1 | 5/2018 |
| WO | 2014/009016 A1 | 1/2014 |

OTHER PUBLICATIONS

Information provided by the DPMA concerning a Euro-PCT application EP 2 872 781 A1, 1 page.
Bibliographic Data, including English Abstract, Document CN105928573A, 2 pages.
International Search Report, International Application No. PCT/GB2019/052519 mailed Dec. 11, 2019, 4 pages.
Written Opinion of the International Searching Authority, International Application No. PCT/GB2019/052519, mailed Dec. 11, 2019, 7 pages.
Bibliographic Data, CN 87207370 U, DepatisNet, 2 pages.
Machine translation of CN 87207370 U, including Abstract, Description and Claims, Espacenet, 5 pages.
Bibliographic Data including English Abstract, CN 2602349 Y, DepatisNet, 2 pages.
Bibliographic Data including English Abstract, CN 104641118 A, DepatisNet, 2 pages.
Chinese Office Action issued Jul. 4, 2022 (first 6 pages) with search report (last 3 pages) dated Jun. 27, 2022, CN Nat'l Phase of PCT/GB2019/052519, for CN Application No. 201980059252.2 entry date Mar. 10, 2021, 9 pages total.
International Preliminary Report on Patentability, International Application No. PCT/GB2019/052519, dated Mar. 9, 2021, 9 pages.

* cited by examiner

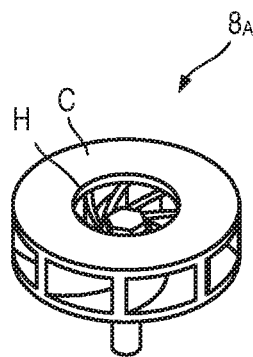
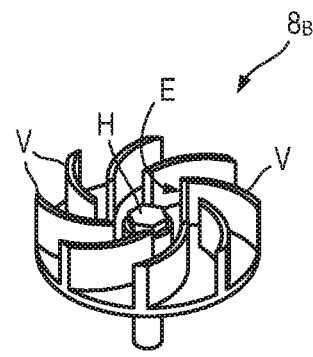
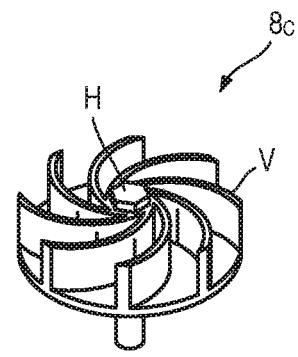
Fig. 9a     Fig. 10a     Fig. 11a
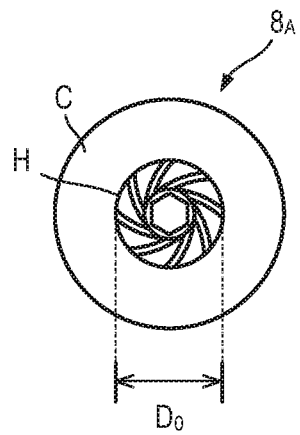
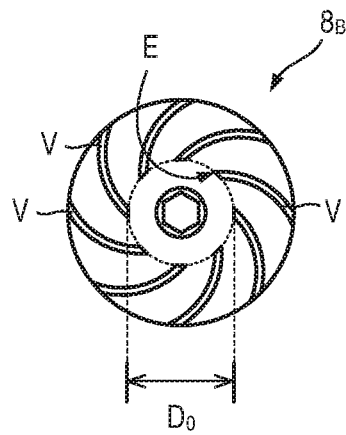
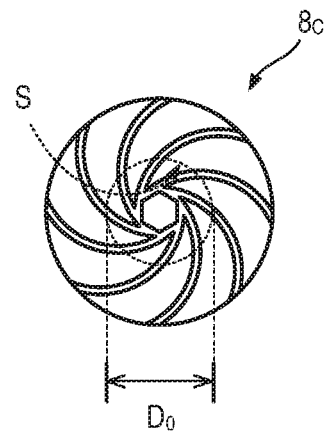
Fig. 9b     Fig. 10b     Fig. 11b

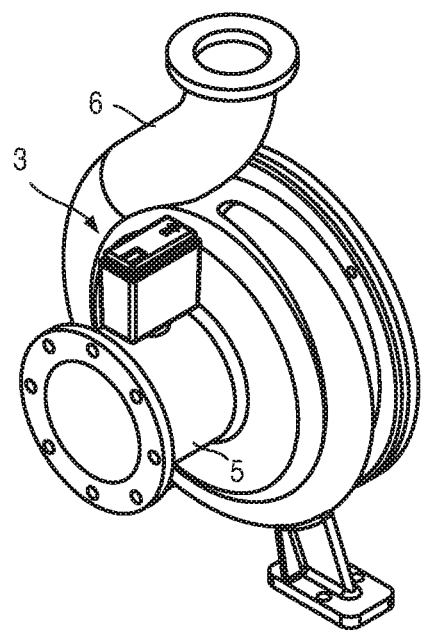
Fig. 19
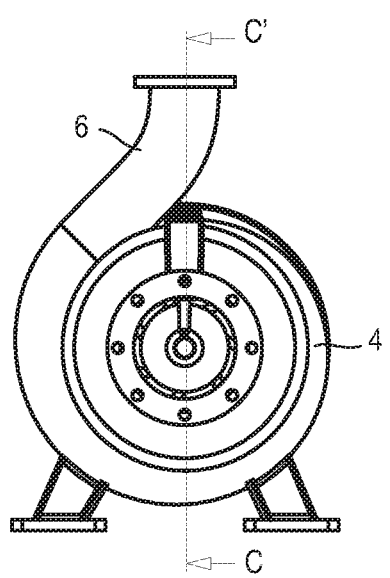 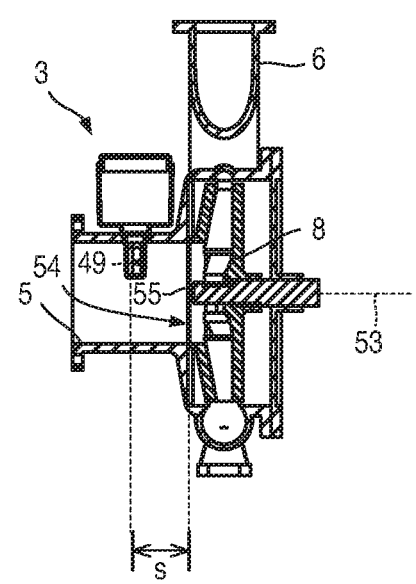
Fig. 20    Fig. 21

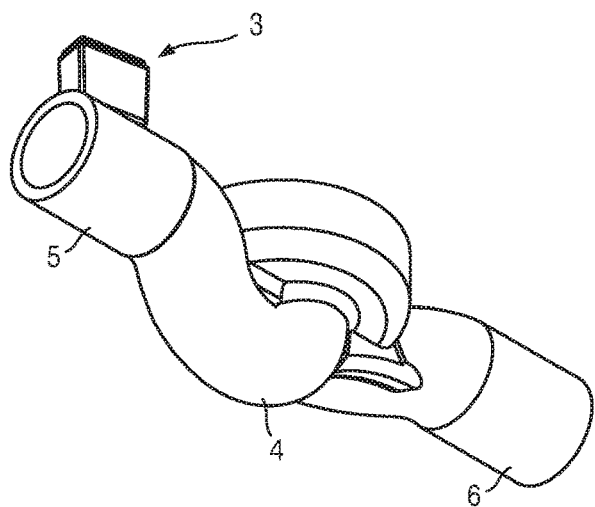
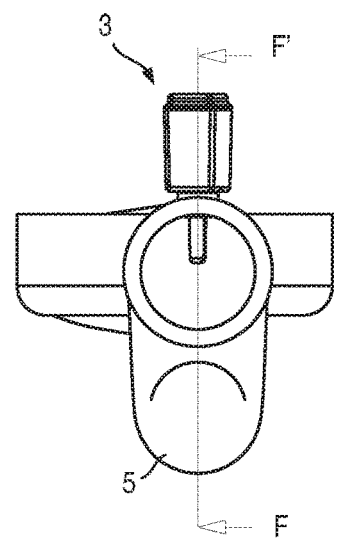
Fig. 29  Fig. 30
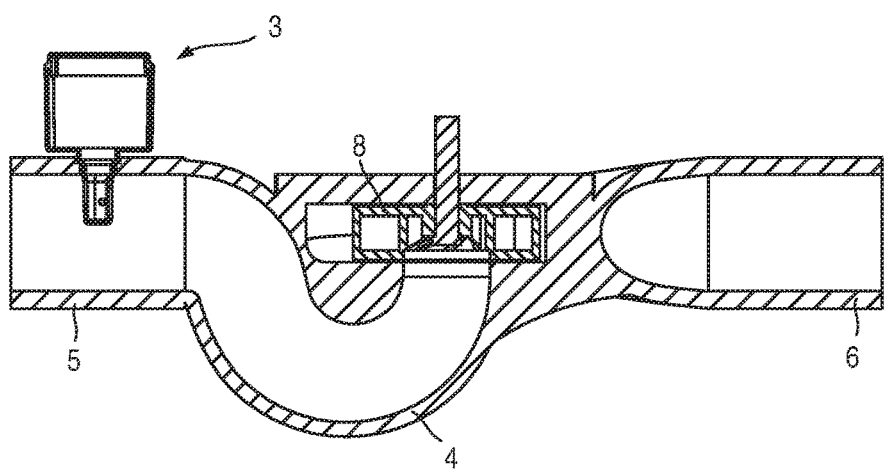
Fig. 31
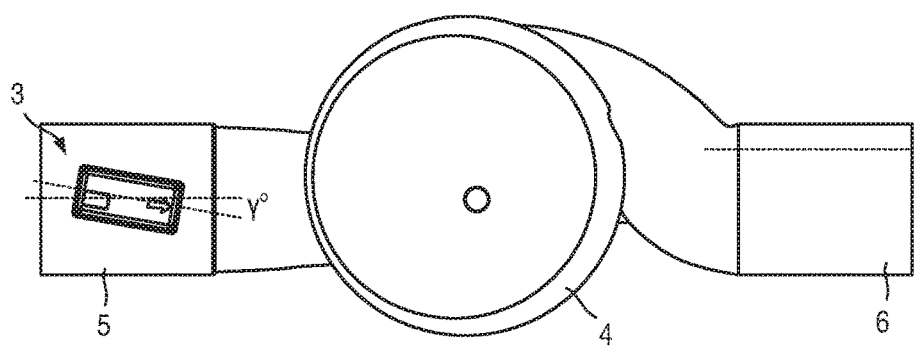
Fig. 32

CENTRIFUGAL PUMP UNIT

FIELD

The present invention relates to a centrifugal pump unit comprising a centrifugal pump and an integrated flow meter.

BACKGROUND

A centrifugal pump can be used to transport a fluid (and even solids) from a suction connection (which may also be referred to as a "suction nozzle" or "inlet") to a pressure connection (which may be referred to as a "pressure nozzle", "discharge nozzle", "discharge" or "outlet") using an impeller disposed in a pump chamber, driven by a motor at a rotational speed typically in a range between 1,000 to 3,000 rpm (although lower and higher speeds can be used). Centrifugal pumps may be used to move a wide variety of fluids including, for example, water, wastewater, and coolants.

The operating point of a centrifugal pump (which depends on flow rate and head) can be determined by measuring differential pressure across the pump and examples of centrifugal pumps in which differential pressure is measured are described in EP 0 774 583 B1 and U.S. Pat. No. 5,129,264 A. Although measuring differential pressure can be effective, the cost of pressure sensors means that this approach is generally only employed in high-performance, high-cost pumps.

Alternatively, the operating point can be determined by measuring the volumetric flow through the pump. Volume flow sensors are usually separate devices connected in series with the pump. This, however, requires more space. Also, flow sensors are typically placed some distance from the pump impeller, outside the pump body itself, where the flow profile is less disturbed and the measurement is less affected by, for example, flow feedback, vortices and other turbulence due to lack of flow conditioning.

Other forms of measurements can be used including mechanical displacement (for example, impellers, turbines and paddles), vortex sensors and ultrasonic sensors. Reference is made to U.S. Pat. No. 5,704,767 A, which describes a pump having a flow meter which includes a pump pair of meshed elliptical gears and to EP 2 872 781 A1, which describes a centrifugal pump fitted with an ultrasonic flow meter.

Mechanical displacement sensors, however, can suffer from clogging and tend to have limited lifespan. Vortex sensors require a minimum flow rate and, therefore, cannot be used for zero flow measurement.

Another approach for determining operating point is "sensorless" whereby the operating point is inferred from pump rotational speed and drive power, using pump characteristic curves. This approach, however, tends to have limited accuracy due to part-to-part variations which can lead to significant deviation from the ideal pump characteristic. Furthermore, in some pumps, the relationship between flow and power is not single-valued and so inferred results can be ambiguous.

SUMMARY

According to a first aspect of the present invention there is provided a centrifugal pump unit. The centrifugal pump unit includes a body which comprises a suction connection, a pressure connection and a pump chamber connecting the suction and pressure connections. The centrifugal pump unit further includes an impeller disposed in the pump chamber and at least one electromagnetic flow sensor arranged to measure flow in at least a part of the suction connection and/or pressure connection and/or pump chamber for determining a flow rate of a fluid through the centrifugal pump unit.

This can help provide a compact centrifugal pump unit which includes a flow meter which can reliably determine flow rate. Herein, "flow" may also be referred to as "flowrate", "volumetric flow" and "volumetric flowrate".

The impeller has an eye having a diameter ("impeller eye diameter") and a central axis. Each electromagnetic flow sensor has first and second electrodes for sensing a voltage having a midpoint between the first and second electrodes. The midpoint of a one or each respective one of the at least one electromagnetic flow sensors may be positioned to measure flow in the suction connection and/or pressure connection and/or pump chamber at a distance of less than or equal to two times the impeller eye diameter, less than or equal to three times the impeller eye diameter, less than or equal to five times impeller eye diameter, less than or equal to six times the impeller eye diameter, less than or equal to ten times the impeller eye diameter.

The impeller has an eye diameter, an impeller axis and a suction-side face defining a plane. Each electromagnetic flow sensor has first and second electrodes for sensing a voltage having a midpoint between the first and second electrodes. Each midpoint is disposed at a separation, s, from an intersection of the impeller axis and the plane of the impeller's suction-side face of less than or equal to two times the impeller eye diameter, less than or equal to three times the impeller eye diameter, less than or equal to five times impeller eye diameter, less than or equal to six times the impeller eye diameter, less than or equal to ten times the impeller eye diameter.

The centrifugal pump unit may include first and second flanges for the suction connection and the pressure connection respectively. A one of the at least one electromagnetic flow sensor may be provided between the first or second flange and the pump chamber.

Each of the at least one electromagnetic flow sensor may be removably attachable to or insertable into the body.

Each of the at least one electromagnetic flow sensors may be provided with a fastener for securing the sensor on the body and an TY-ring for providing a seal between the sensor and the body. The fastener may be a clip. The fastener may take the form of complementary structures providing a bayonet fixture.

Each of the at least one electromagnetic flow sensors may include first and second electrodes for sensing a voltage.

The centrifugal pump unit may further comprise a controller configured to receive measured voltage signal(s) from the at least one electromagnetic flow sensor and to output a signal or value dependent on the measured voltage signal(s) which is indicative of the flow rate of the fluid through the centrifugal pump unit.

The controller may be configured to correct the voltage signal, the signal dependent on the measured voltage signal or an intermediate signal between the measured voltage signal and signal dependent on the measured voltage signal using a pump speed and/or a motor load, or an operating point with respect to the Best Efficiency Point of the pump and/or the best operating point with respect to the overall efficiency of the system within which the pump or pumps operate.

The controller may be configured to receive or to store data indicative of a tube diameter for the suction or pressure connection and to compute the signal or a value in dependence on the tube diameter and a pre-defined relationship between the tube diameter and volumetric flow rate, Q.

The controller may be configured to receive or to store a correction value and to compute the signal or a value in dependence on the correction value and a pre-defined relationship between the tube diameter and volumetric flow rate, Q.

At least one of the at least one electromagnetic flow sensors may include a temperature sensor for providing temperature data. The controller may be configured to use the temperature data to correct for thermal dependence of offset/sensitivity. The controller may be configured to output a signal or value representative of the temperature of the fluid.

The centrifugal pump unit may comprise at least two electromagnetic flow sensors which are provided at different positions on the pump body, each electromagnetic flow sensors providing a respective voltage signal, wherein the controller is configured to compute a volumetric flow rate using the voltage signals.

Each of the at least one electromagnetic flow sensors may be arranged within the body of the pump such that the sensor measures flow in a region which exhibits a monotonic relationship, over a least part of the flow range of the pump, between measured flow and actual flow rate.

Each of the at least one electromagnetic flow sensors may have an orientation and a position with respect to such that the sensor measures flow in a region which exhibits a monotonic relationship, over a least part of the flow range of the pump, between measured flow and actual flow rate, wherein the angle includes a first component.

The orientation includes a circumferential angle about a central axis of the connection. The orientation may include a pitch, yaw and roll with respect to the connection.

Each of the electromagnetic flow sensors may be an insert-type sensor comprising a vane protruding into a lumen of the suction connection or a lumen of the pressure connection. Side walls of the vane may taper from a wide front to a narrow end along an axis (length), the vane orientated in the lumen of flow such that the axis is parallel to inner walls of the connection. This can help to reduce pressure drop.

Each of the at least one electromagnetic flow sensors may be arranged at a circumferential angle about a central axis of the suction connection or a central axis of the pressure connection such that the sensor measures flow velocity in a region of the pump which exhibits a monotonic relationship between measured flow velocity and volumetric flow rate. For example, recycling flows in the region of pump are not present across the given flow range of the pump or present across less than 5% of the given flow range. The given flow range preferably is zero to maximum rated flowrate of the pump and so recycling flows, if present, is normally found in at between 0% to 5% of the maximum rated flowrate of the pump.

The cross section of a lumen of the pump body is larger at a first position where the at least one electromagnetic flow sensor is inserted than a second position along the pump either side of the first position.

Making the pump bore wider where the flow sensor is inserted can help to maintain cross-sectional area and so reduce minimize any pressure drop caused by the at least one electromagnetic flow sensor is inserted.

According to a second aspect of the present invention there is provided a set of centrifugal pump units. At least two centrifugal pumps units have different pump diameters and the at least two centrifugal pumps have the same size of electromagnetic flow sensor and same depth of insertion measured from a face against which the sensor abuts. Thus, one size of sensor can be used over a range of different pump sizes.

According to a third aspect of the present invention there is provided a temperature-regulating system comprising a fluid circuit which includes at least one a heat source, at least one heat sink and at least one centrifugal pump unit arranged to pump fluid around the fluid circuit.

According to a fourth aspect of the present invention there is provided a fluid-handling system comprising a fluid path between a fluid source, a fluid sink and at least one centrifugal pump unit arranged to pump fluid along the fluid path.

The fluid may be water or may contain water, e.g. a solution, a suspension or a mixture of water, a solution or suspension and solids, or another ionic liquid. The fluid may be coolant, heating medium or other electrically-conductive liquid.

According to a fifth aspect of the present invention there is provided a method of determining a flow rate of a fluid through a centrifugal pump unit, the method comprising receiving measured voltage signal(s) from at least one electromagnetic flow sensor arranged to measure flow in a suction connection and/or a pressure connection of a centrifugal pump unit and to output a signal or value dependent on the measured voltage signal(s) which is indicative of the flow rate of the fluid through the centrifugal pump.

According to a sixth aspect of the present invention is provided a computer program comprising instructions for performing the method.

According to a seventh aspect of the present invention is provided a computer program product comprising a computer readable medium (which may be non-transitory) storing the computer program.

According to an eighth aspect of the present invention is provided a method of determining an insertion depth, angle, and position for an electromagnetic flow sensor in a suction connection and/or pressure connection of a centrifugal pump. The method comprises using computational fluid dynamics and/or experiments over a given range of flow rates to identify the insertion depth and the location for the electromagnetic flow sensor, including, for a first combination of insertion depth and position identifying a monotonic relationship between computed and/or measured flow rate and computationally-specified and/or actual flow rate and, for a second different combination of insertion depth and position, identifying a non-monotonic relationship between computed and/or measured flow rate and computationally-specified and/or actual flow rate and recording the first combination of insertion depth and position.

The method preferably comprises comparing the computed and/or measured flow rate with a respective reference flow rate measured with a reference flowmeter. The method may comprise accepting a combination of insertion depth, angle and position if the computed and/or measured flow rate lies within 15%, preferably within 10% or more preferably within 5% of the reference flow rate.

The method may comprise using computational fluid dynamics over a given range of flow rates to identify a candidate insertion depth and location for the electromagnetic flow sensor and using experiments using the electromagnetic flow sensor in the candidate insertion depth and location over the given range of flow rates to determine a calibration factor or calibration function.

According to a ninth aspect of the present invention there is provided a computer program comprising instructions which, when executed by at least one processor, causes the at least one processor to perform the method of determining an insertion depth and position for an electromagnetic flow sensor in a suction connection and/or pressure connection of a centrifugal pump.

According to a tenth aspect of the present invention there is provided a computer program product comprising a computer-readable medium (for example, a non-transitory computer-readable medium) storing the computer program.

The sensor is preferably an insert electromagnetic sensor which measures the velocity of the fluid in the vicinity of the sensor.

The insert electromagnetic flow sensor may comprise an injection moulded engineering plastic body including a vane, sealing portion and an external housing and connector portion. The sensor may be mounted through a hole in the pump body such that the vane protrudes into the flow.

The sensor can be retained on the pump body using a clip and sealed onto a machined face in the pump body using an 'O'-ring. Alternatively, the sensor can be screwed into the pump body with a stop provided to ensure the correct alignment. Alternatively, other retaining methods include bayonet fittings, adhesives, press-fitting and the like.

The vane can be profiled to minimise the pressure loss on the total dynamic head of the pump. Accordingly, the vane may be tapered downstream and the width of the vane perpendicular to the flow can be minimised. The vane may protrude into the flow by an insertion depth varying from flush with the flow passage to any depth into the flow passage.

The vane may contain a magnetic field generating device comprising a drive coil which may be a self-supporting coil or be wound around a core (for example, made of soft magnetic material), a bobbin or other support. The direction of the magnetic field can be flipped by changing the polarity of the current driving the coil. The frequency of the current may be set according to application.

Electrically-conductive electrodes directly contact the liquid. The electrodes are positioned such that a voltage is generated between the electrodes in accordance with Faraday's law if an electrically conductive fluid flows past the vane where a component of the flow is perpendicular to the magnetic field.

An 'O'-ring around the electrodes forms a pressure barrier between the liquid and the inside of the sensor. Holes in the plastic vane allow the electrodes to contact directly with the water. The printed circuit board may be the same board used for the sensor electronics.

In another embodiment, the electrodes consist of a metal plug, washer and 'O'-ring.

Electronics can be contained within the external housing portion of the plastic body. The sensor can be powered externally, for example, from the pump drive. A microcontroller can be used for generating the drive signal for the magnetic field drive coil. The electronics can amplify and filter the electrode signals to generate a flow velocity signal as an output.

The entire sensor electronics can be part of the pump electronics, i.e., housed in the pump's electronics enclosure. In one embodiment, a separate microprocessor can be used for the flow measurement system. In another embodiment, the microprocessor which is already being used for pump control may be used for the flow measurement. In this case, the microprocessor is already a part of the pump electronics and therefore already available. This can help to reduce failure safety and/or reduce production costs for the pump.

A temperature sensor may be included in the electromagnetic flow sensor. The temperature measurement may be provided as an output from the flow sensor. The temperature measurement may also be used to correct for thermal dependence of the gain or offset of the flow sensor.

In one embodiment, the electromagnetic flow sensor may be mounted in the pressure connection of the pump body.

The electromagnetic flow sensor may be mounted in the suction connection of the pump body. Two electromagnetic flow sensors may be mounted in the pump body, with one in the pressure connection of the pump body and another in the suction connection of the pump body. Thus, it is possible to determine respective measured values at two different positions within the pump.

The electromagnetic flow sensor can measure the velocity, v, of the pumped fluid in the vicinity of the flow sensor. In the case where the sensor signal is provided as an input to the pump control algorithm, the velocity signal may not be corrected to provide volumetric flow rate.

Alternatively, the volumetric flow rate, Q, can be calculated according to $Q = k \times A \times v$, where A is the cross-sectional area of the pipe where the flow sensor is inserted, and k is an average velocity divided by the velocity v at the sensor. In this case the electromagnetic flow meter may be pre-calibrated in different uniform tube diameters to give a defined relationship between diameter and volumetric flow rate, Q, of a given indicated flow velocity.

It may improve the accuracy of the volumetric flow estimate to correct the velocity reading of the flow sensor using pump rpm (i.e., rotational speed) and/or motor load or operating point.

According to an eleventh aspect of the present invention there is provided a centrifugal pump system. The centrifugal pump system comprises a centrifugal pump, an integrated flow meter, a motor arranged to drive the centrifugal pump and a pump controller. The pump controller is configured to control the centrifugal pump in dependence upon a flow demand.

The flow demand is preferably an external flow demand. The sensed flow may be provided by a velocity sensor, such as an electromagnetic flow sensor.

BRIEF DESCRIPTION OF THE DRAWINGS

Certain embodiments of the present invention will now be described, by way of example, with reference to the accompanying drawings, in which:

FIG. 9A is a perspective view of a closed impeller;

FIG. 9B is a top view of the closed impeller shown in FIG. 9A;

FIG. 10A is a perspective view of a first type of open impeller;

FIG. 10B is a top view of the first type of open impeller shown in FIG. 10A;

FIG. 11A is a perspective view of a second type of open impeller;

FIG. 11B is a top view of the second type of open impeller shown in FIG. 11A;

FIG. 19 is a perspective view of a seventh centrifugal pump unit;

FIG. 20 is a side view of the centrifugal pump unit shown in FIG. 19;

FIG. 21 is a section taken vertically through the centrifugal pump unit shown in FIG. 20 in the plane indicated by the line C-C';

FIG. 29 is a perspective view of a tenth centrifugal pump unit;

FIG. 30 is an end view of the centrifugal pump unit shown in FIG. 29;

FIG. 31 is a section taken vertically through the centrifugal pump unit shown in FIG. 29 in the plane indicated by the line F-F';

FIG. 32 is a top view of the centrifugal pump unit shown in FIG. 29;

DETAILED DESCRIPTION OF CERTAIN EMBODIMENTS

Figure 1:
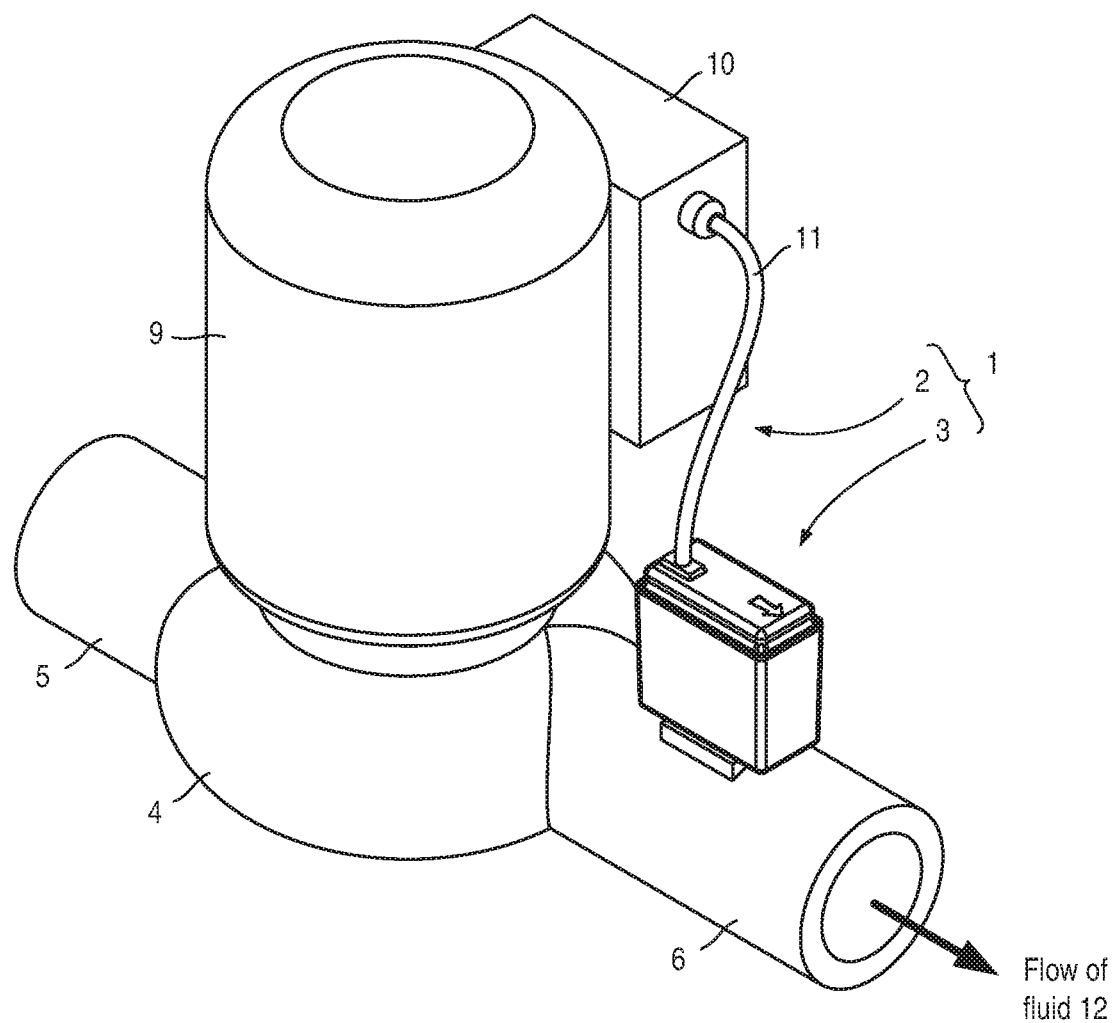
FIG. 1 is a perspective view of a centrifugal pump unit comprising a centrifugal pump having an integrated flow meter.

Referring to FIG. 1, a centrifugal pump unit 1 is shown which comprises a centrifugal pump 2 having an integrated flow meter 3. Herein, the flow meter 3 is also referred to as a "flow sensor".

Figure 8:
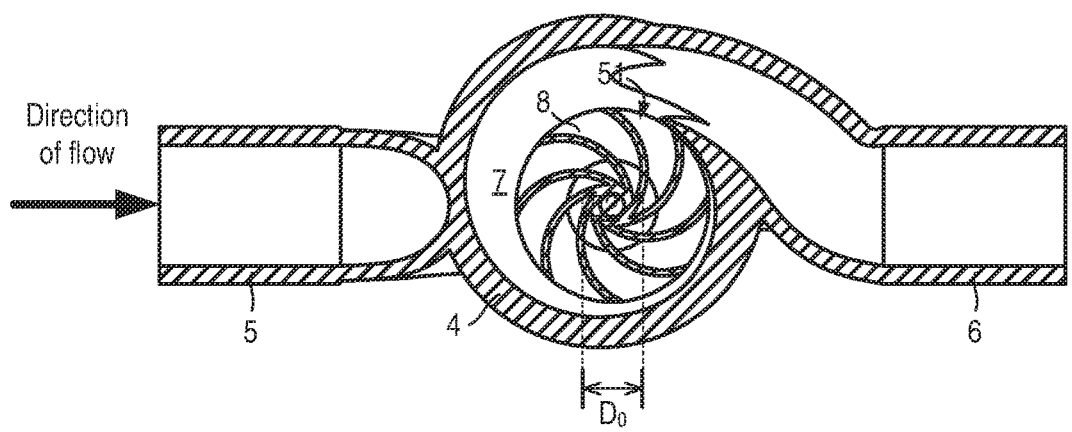
FIG. 8 is a longitudinal section taken horizontally through the centrifugal pump unit shown in FIG. 6.

The centrifugal pump unit 1 includes a body 4 which comprises a suction connection 5, a pressure connection 6 and a pump chamber 7 (FIG. 8) connecting (i.e., in fluid communication with) the suction and pressure connections 5, 6. The suction and pressure connections 5, 6 are tubular having inner and outer diameters. The centrifugal pump unit 1 includes an impeller 8 (FIG. 8) disposed in the pump chamber 7 (FIG. 8). The impeller 8 (FIG. 8) is driven by an electric motor 9 which is controlled by a pump drive and control electronics module 10 (herein referred to simply as a "control module").

The centrifugal pump unit 1 includes at least one electromagnetic flow sensor 3 arranged to measure flow velocity in at least a part of the suction connection 5 and/or pressure connection 6 for determining a flow rate of a fluid 12 through the centrifugal pump unit. In this example, the centrifugal pump unit 1 has one electromagnetic flow sensor 3 arranged to measure flow in at least a part of the pressure connection 6.

The control module to and the electromagnetic flow sensor 3 are connected by a multi-wire connection 11. The connection 11 can be used to provide power to the electromagnetic flow sensor 3 and to deliver sensor signals 14 (FIG. 49) to the control module 10.

Figure 2:
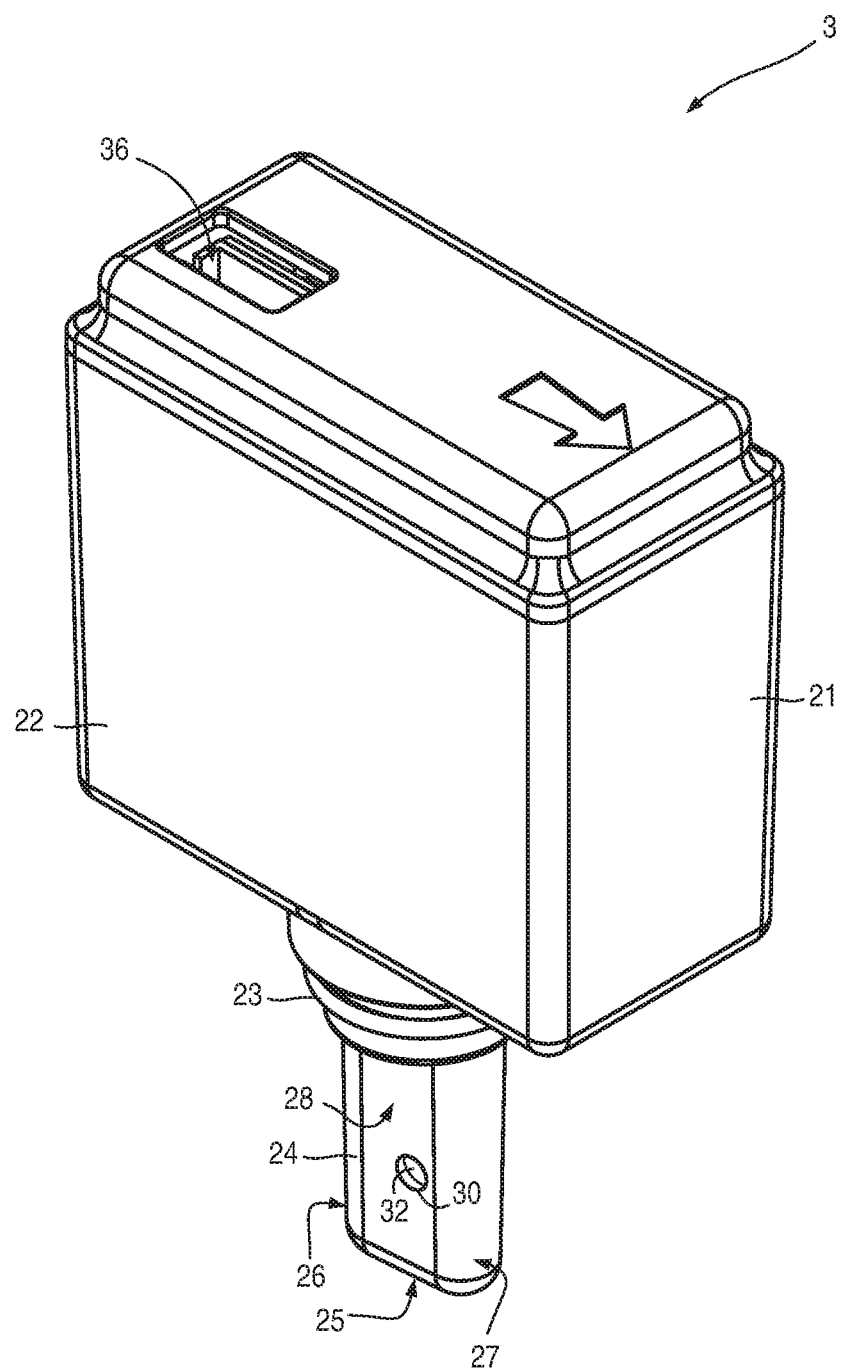
FIG. 2 is a perspective view of a flow meter in the centrifugal pump unit shown in FIG. 1 which includes a vane for insertion into a lumen of a pump.

Referring to FIG. 2, the electromagnetic flow sensor 3 (which is also referred to herein as a "flow sensor assembly") is shown in more detail.

Figure 5:
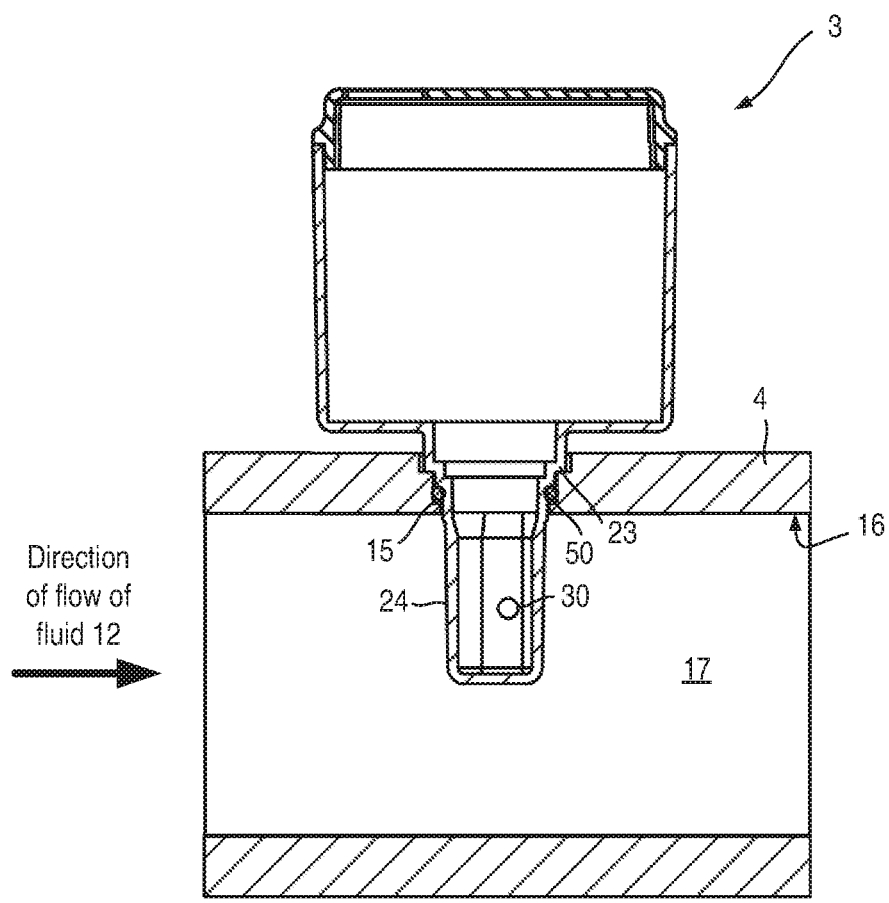
FIG. 5 is a longitudinal section through a flow meter shown in FIG. 2 and a suction connection.

The electromagnetic flow sensor 3 is an insert-type of sensor 3 which can be manufactured separately from the rest of the pump 2 (FIG. 1) and then inserted through an aperture 15 (FIG. 5) in a part of the pump body 4 such as the pressure connection 6, so that it protrudes past the inner wall 16 (FIG. 5) into a connection lumen 17 (or "space"). The flow sensor 3, however, can be mounted so as to be flush with inner wall 16 (FIG. 5).

The flow sensor 3 comprises a housing 21 formed of a plastics material or other suitable material.

The housing 21 includes a generally box-like main portion 22, a short, stepped, tubular sealing portion 23, provided on one face of the main portion 22, for engaging with and providing a seal to the pump body 4 and a generally long, thin sensing portion 24 (herein referred to as a "vane" or "finger") extending away from the sealing portion 23.

The sensing portion 24 has a distal end 25, a rounded front face 26, a rounded back end 27 and opposite side walls 28, 29. The front face 26 is wider than the back end 27 and the sensing portion 23 becomes narrower (i.e., tapers). Each side wall 28, 29 has a respective aperture or hole 30, 31 to expose electrodes 32, 33 to direct contact by a fluid F whose velocity is being measured, from which a volumetric flow rate can be determined.

As will explained in more detail hereinafter, the housing 21 contains a printed circuit board assembly 34 (FIG. 3) which includes a printed circuit board 35 (FIG. 3) and a power and data connector 36 (or "port") for receiving a corresponding connector (not shown) of the multi-wire connection 11.

Ultrasonic flow sensors, pressure-based approaches to flow measurement and flow meters which are placed far from the pump, tend to measure volumetric flow rate through the bore of a pipe or pump. An electromagnetic flow sensor does not measure volumetric flow rate in the same way. Instead, an electromagnetic flow sensor only w measures velocity (herein also referred to as "flow velocity") of a fluid in a small region in the pipe or bore. Despite this, the electromagnetic flow sensor can be located in a position where the flow velocity is linearly-related or at least monotonically-related to volumetric flow rate over a range of flow rates. Using a conversion value(s) or conversion functions, the electromagnetic flow sensor can be used to determine volumetric flow rate.

An electromagnetic flow sensor can have one or more advantages compared to other types of flow sensor.

Flow conditioning is not necessarily needed when using an electromagnetic flow sensor and so can be omitted thereby reducing or avoiding altogether introduction of pressure drops. In fact, the pump body in the region where the sensor is inserted can be increased to maintain cross-sectional area of the pump and so minimize pressure drop caused by adding the sensor.

An electromagnetic flow sensor can help achieve a high turndown ratio, for example, exceeding 500 or even 700, and/or can allow measurement of reverse flow.

One size of electromagnetic flow sensor having one insertion depth can be used for a range of pump diameters. As will be explained in more detail hereinafter, a flush-fitting electromagnetic flow sensor (i.e., with zero or substantially zero insertion depth) can be used.

An electromagnetic flow sensor is less sensitive to, and may be insensitive to, pressure pulses.

Further details of the electromagnetic flow sensor 3 will now be described.

Figure 3:
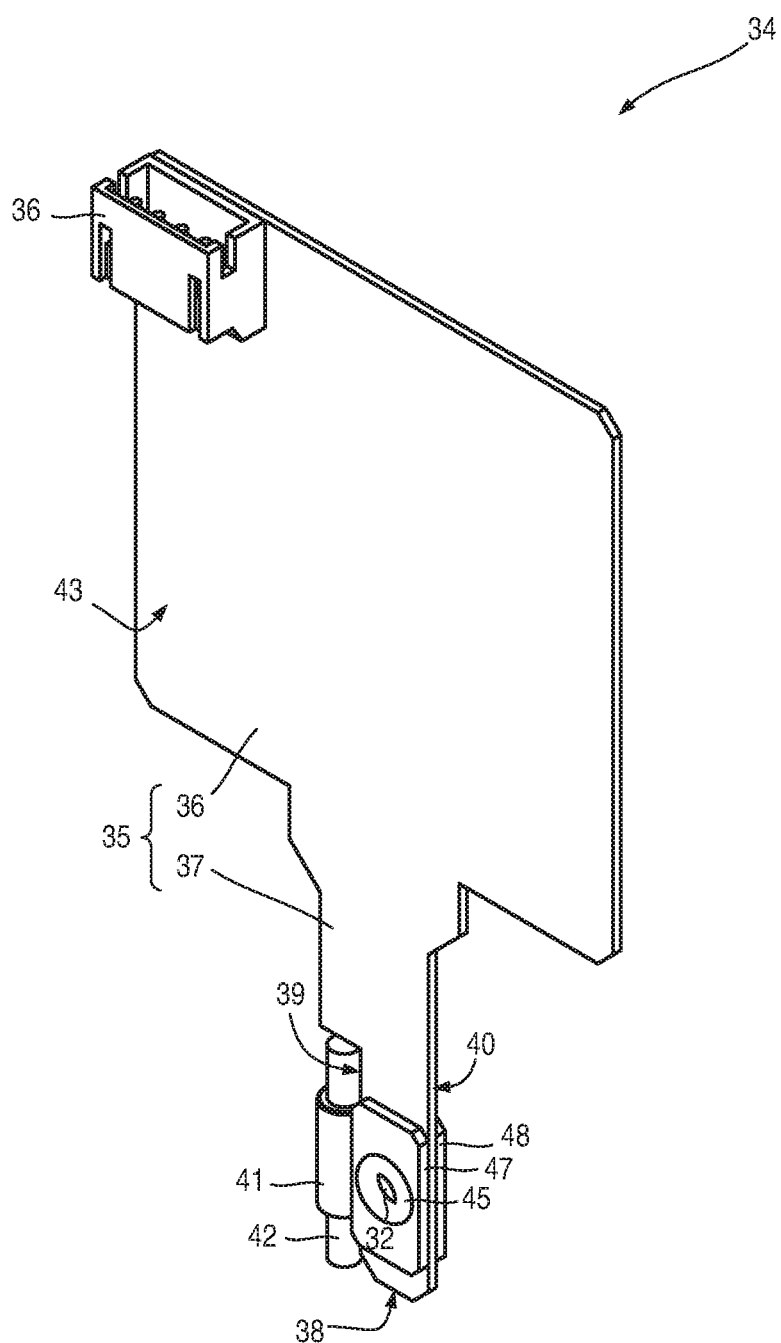
FIG. 3 is a perspective view of a circuit board and drive coil assembly included in the flow meter shown in FIG. 2.
Figure 4:
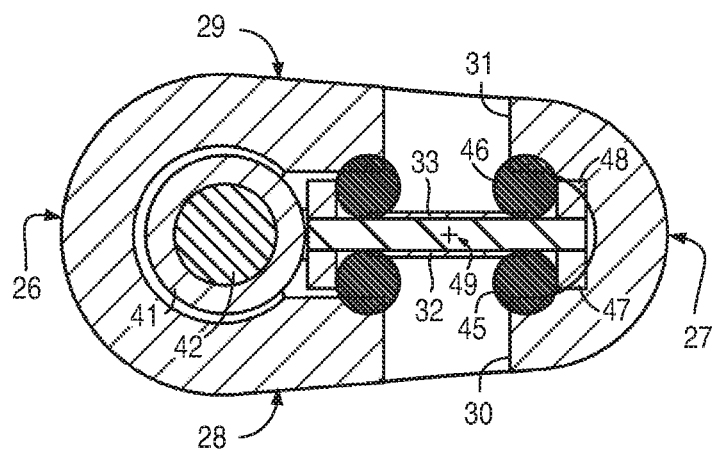
FIG. 4 is a transverse cross-section through the vane of flow meter shown in FIG. 2.

Referring to FIGS. 3 and 4, the printed circuit board assembly 34 is shown.

The printed circuit board assembly 34 comprises a printed circuit board 35. The printed circuit board 35 includes a first, relatively wide portion 36 supporting electronic circuitry (not shown in FIG. 3 for clarity) and which is disposed in the box-like main portion 22 (FIG. 2) of the sensor 3, and a second, relatively narrow portion 37 (or "finger-like portion" or "finger") extending from the first portion 36 and which is housed in the sealing and sensing portions 22, 23 (FIG. 2) of the sensor.

Close to a distal end 38 along a first long edge 39, the finger-like portion 37 of the printed circuit board 35 carries a drive coil 41 supported on a core 42. The core 42 may consist of, for example, a soft magnetic material or ceramic.

Next to the drive coil 41, between the first and second long edges 39, 40, the finger-like portion 37 supports an electrode 32, 33 on each face 43, 44 of the printed circuit board 35. The electrodes 32, 33 may take the form of plated pads of metal. The finger-like portion 37 also supports respective annular seals 45, 46, for example, in the form of 'O'-rings, held in respective seal holders 47, 48. The electrodes 32, 33 have a midpoint 49, i.e., at a point half way between the electrodes 32, 33 and between the ends of the electrodes 32, 33.

Referring to FIG. 5, the flow sensor 3 is shown mounted in the pump body 4.

The vane 24 is inserted through an aperture 15 in the pump body 4 so that it protrudes past the inner wall 16 and into the pump lumen 17 through which fluid flows. The aperture 15 is preferably stepped and has a corresponding profile to the stepped sealing portion 23 of the sensor. An 'O'-ring 5o or other similar seal is provided to help provide 3o a fluid-tight seal and the sensor 3 can be held in place by a clip or securing means, e.g., a bayonet fitting.

Figure 6:
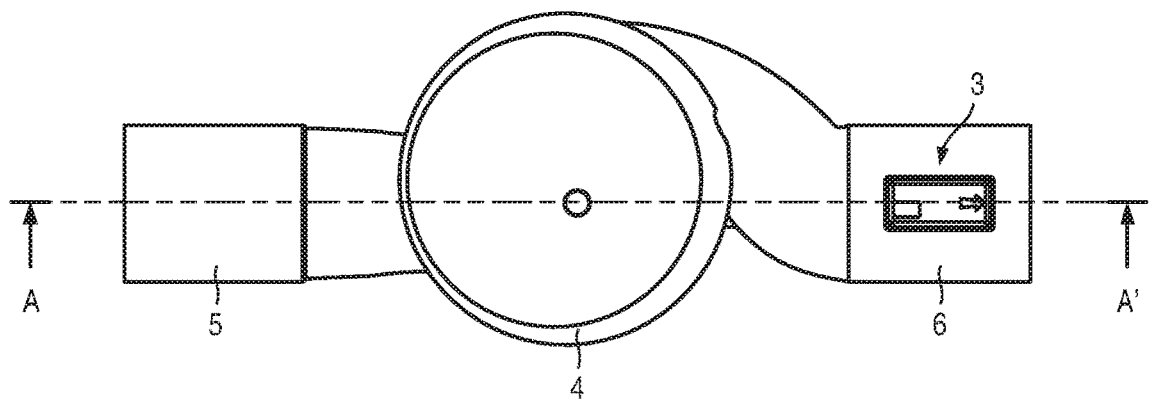
FIG. 6 is a top view of the centrifugal pump unit shown in FIG. 1.
Figure 7:
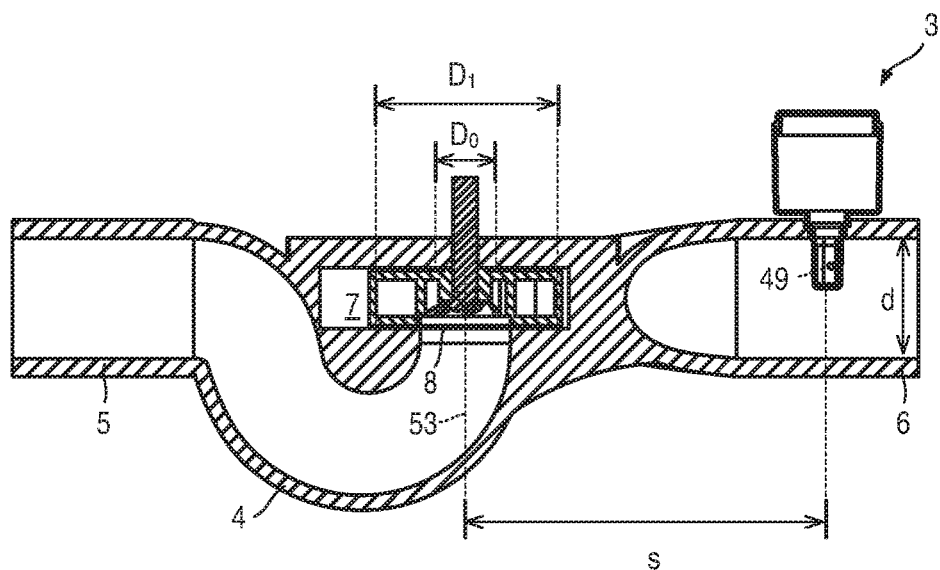
FIG. 7 is a longitudinal section taken vertically through the centrifugal pump unit shown in FIG. 6 in the plane indicated by the line AA'.

Referring to FIGS. 6, 7 and 8, the flow sensor 3 is inserted in the pressure connection 6 close to the impeller 8.

The impeller 8 has an outer edge 51 and an impeller diameter, $D_1$, and an eye 52 having an impeller eye diameter, $D_O$, and an eye center axis 53.

The eye diameter, $D_O$, depends on the type of impeller.

Referring to FIGS. 9A and 9B, for a closed impeller $8_A$, the eye diameter, $D_O$, is defined by a hole H in cover C.

Referring to FIGS. 10A and 10B, for a first type of open impeller $8_B$, the eye diameter, $D_O$, is defined by the inside edges E of curved vanes V which do not meet a hub H.

Referring to FIGS. 11A and 11B, for a second type of open impeller $8_C$, the eye diameter, $D_O$, is defined by the (internal) diameter of a suction flow S that opens onto the impeller 8C which include curved vanes V which meet a hub H.

Referring again to FIGS. 6, 7 and 8, for a flow sensor which is inserted in the pressure connection and/or the pump chamber of a centrifugal pump, the flow sensor is mounted such that a separation, s, between the central axis 53 of the impeller 8 and the midpoint 49 between the electrodes is less than or equal to ten times the impeller eye diameter (i.e., $s \leq 10D_0$), less than or equal to six times the impeller eye diameter (i.e., $s \leq 6D_0$), less than or equal to five times the impeller eye diameter (i.e., $s \leq 5D_0$), less than or equal to four times the impeller eye diameter (i.e., $s \leq 4D_0$) or less than or equal to three times the impeller eye diameter (i.e., $s \leq 3D_0$). The sensor may be mounted in the pump chamber on the side furthest from the outlet.

In these examples, the flow sensor(s) 3 are mounted on top of or under the connection 5, 6, i.e., at an angle of 0° or 180°.

Figure 12:
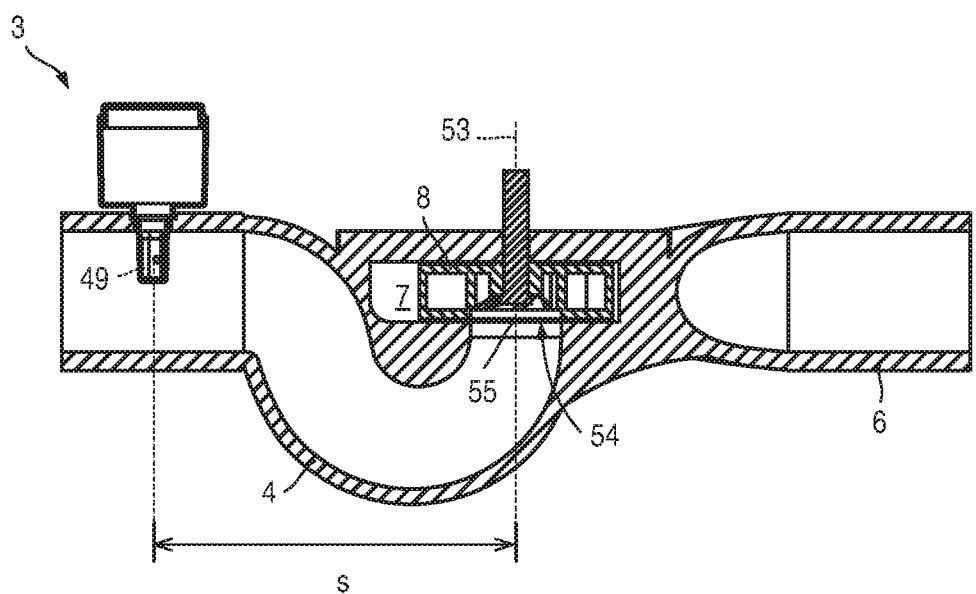
FIG. 12 is a longitudinal section through a second centrifugal pump having a pressure connection flow meter mounted parallel to an axis of rotation of an impeller of a centrifugal pump.
Figure 13:
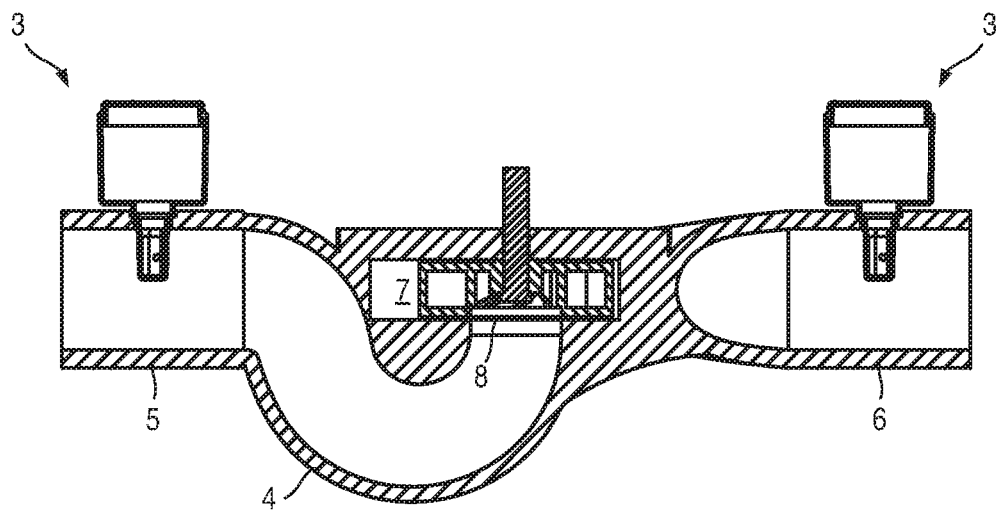
FIG. 13 is a longitudinal section through a third centrifugal pump having a suction connection flow meter and a pressure connection flow meter both mounted parallel to an axis of rotation of an impeller of a centrifugal pump.
Figure 14:
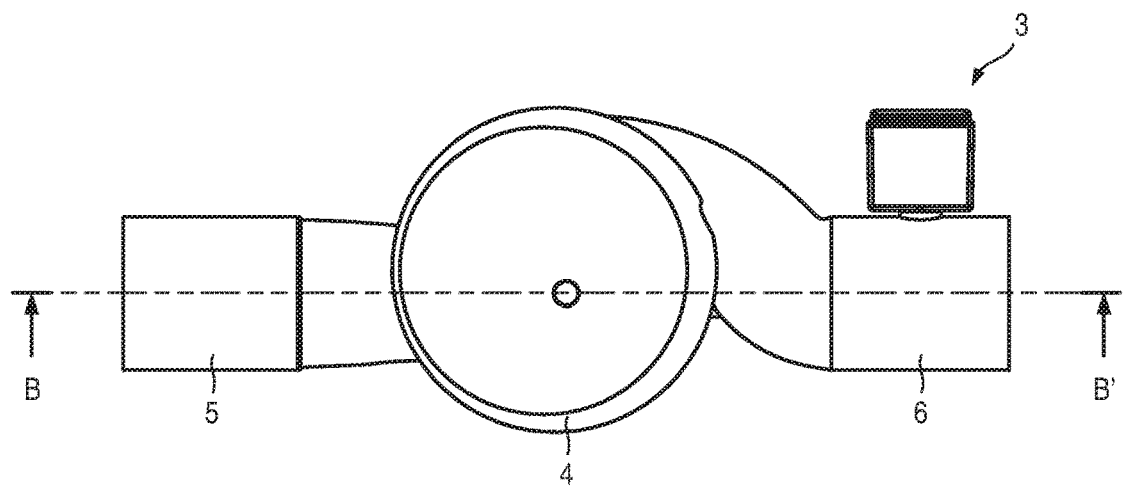
FIG. 14 is a top view of a fourth centrifugal pump unit.
Figure 15:
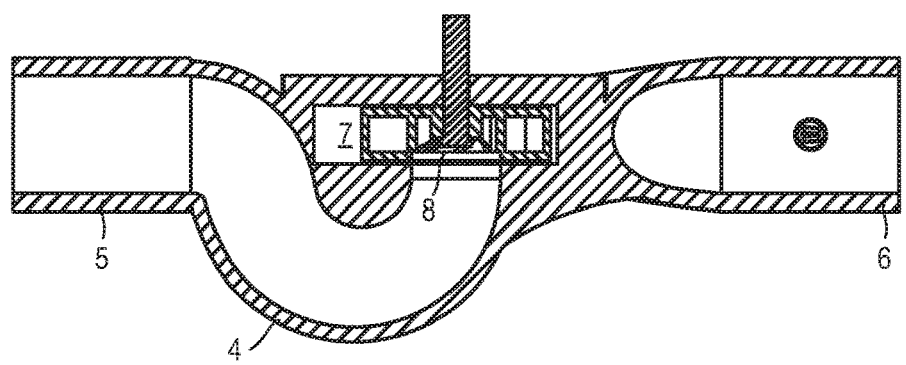
FIG. 15 is a longitudinal section taken vertically through the centrifugal pump unit shown in FIG. 14 in the plane indicated by the line BB'.
Figure 16:
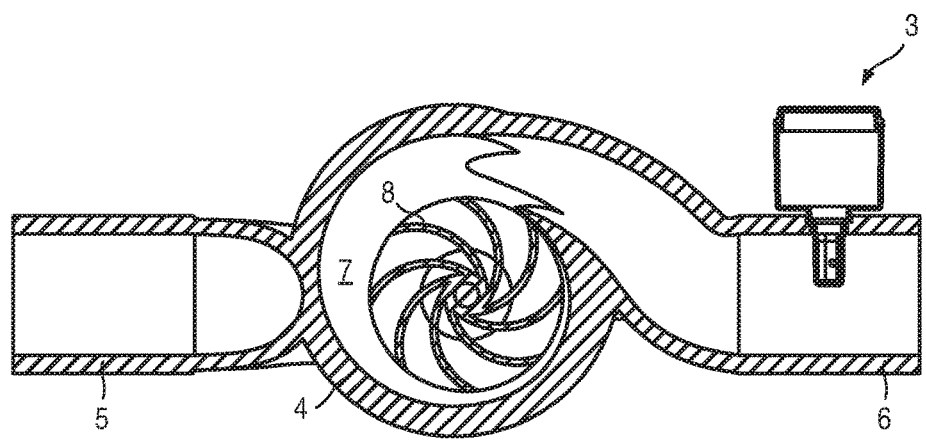
FIG. 16 is a longitudinal section taken horizontal through the centrifugal pump unit shown in FIG. 14.
Figure 17:
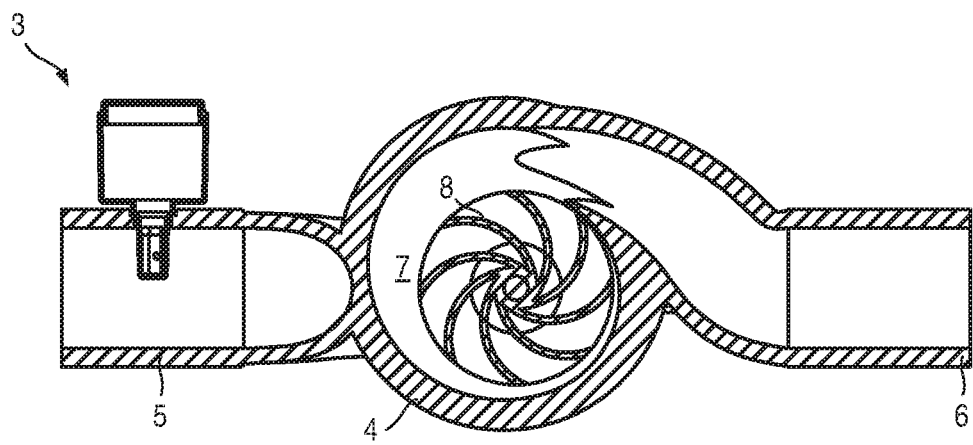
FIG. 17 is a longitudinal section through a fifth centrifugal pump unit.
Figure 18:
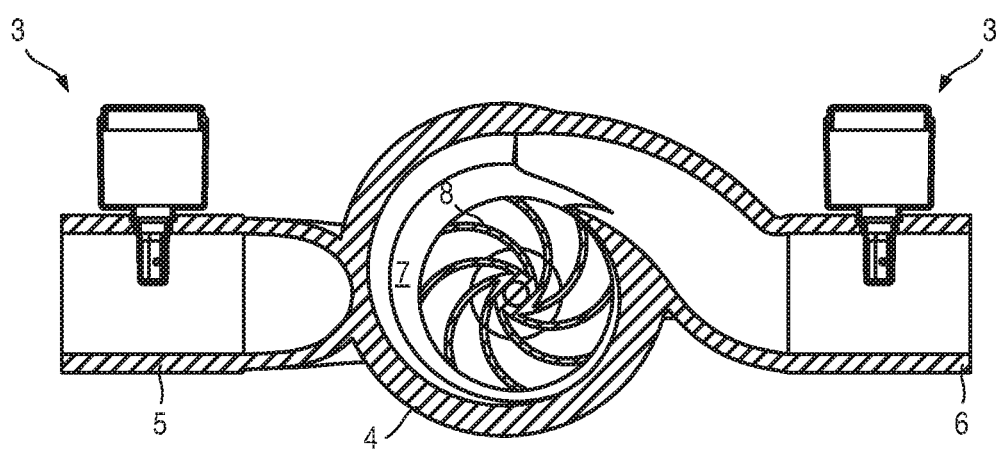
FIG. 18 is a longitudinal section through a sixth centrifugal pump unit.

Referring to FIGS. 12 and 13, a flow sensor 3 may alternatively or additionally be inserted in the suction connection 5.

Referring to FIGS. 14 to 18, the flow sensors 3 can be mounted on either side of (as opposed to on top of or below) the connection 5, 6, i.e., at an angle of 90° or 270°.

For a flow sensor which is inserted in the suction connection of a centrifugal pump, the flow sensor is mounted such that a separation, s, between the midpoint between the electrodes 49 and a point 55 defined by the point where the axis of the impeller 53 passes through a perpendicular plane which defines the impeller face 54 closest to the suction side is less than or equal to ten times the impeller eye diameter (i.e., $s \leq 10D_0$), less than or equal to eight times the impeller eye diameter (i.e., $s \leq 8D_0$), less than or equal to six times the impeller eye diameter (i.e., $s \leq 6D_0$ less than or equal to four times the impeller eye diameter (i.e., $s \leq 4D_0$). If the impeller does not have a flat face 54 closest to the suction side, then the axial extremities of the impeller, located closest to the suction side, that lie within a plane define the impeller face closest to the suction side.

Referring to FIGS. 19 to 36, the flow sensor(s) 3 can be mounted at other angles and/or may be mounted such that the axis of the sensor is not parallel to the impeller axis and/or is swivelled left or right ("yaw") and/or tilted forward or back ("pitch") and/or tilted left or right ("roll"). This can help to align the flow sensor to the flow since a higher signal can be achieved when the flow lines in the sensor's vicinity are aligned with the sensor, in other words, the electrodes are perpendicular to the flow lines, and the axis of the sensor is perpendicular to the flow lines.

FIGS. 19 to 21 show a centrifugal pump unit in which the sensor 3 is mounted in a part of the suction connection 5 which is parallel to the impeller axis 53.

Figure 22:
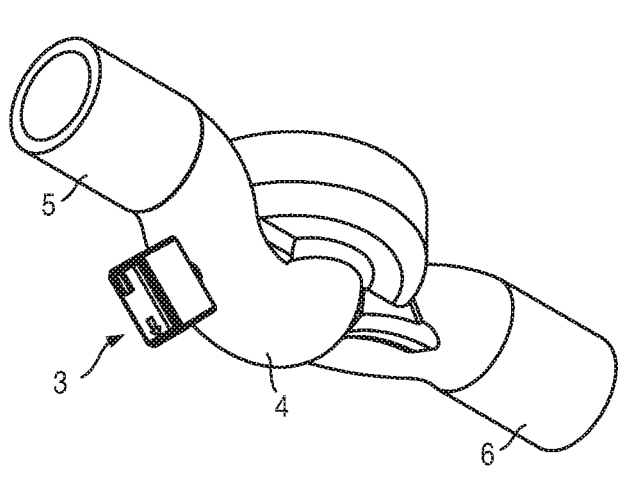
FIG. 22 is a perspective view of an eighth centrifugal pump unit.
Figure 23:
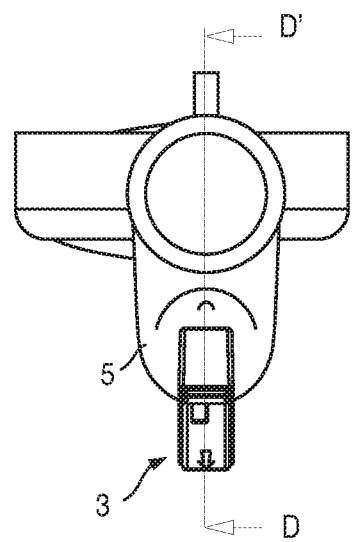
FIG. 23 is an end view of the centrifugal pump unit shown in FIG. 22.
Figure 24:
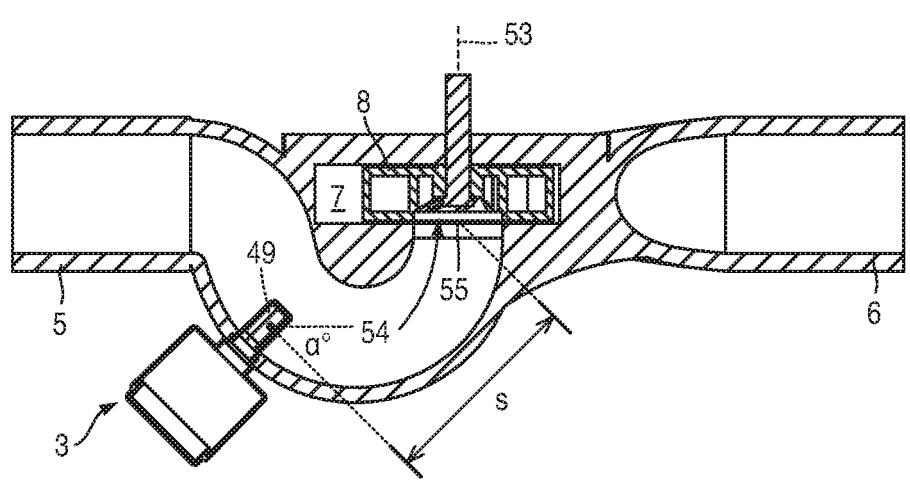
FIG. 24 is a section taken vertically through the centrifugal pump unit shown in FIG. 23 in the plane indicated by the line D-D'.
Figure 25:
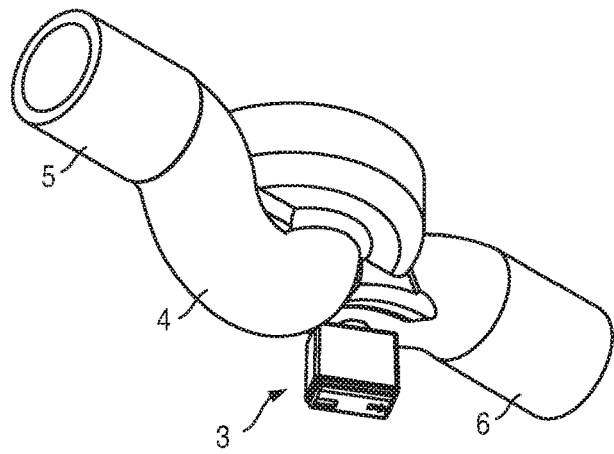
FIG. 25 is a perspective view of a ninth centrifugal pump unit.
Figure 26:
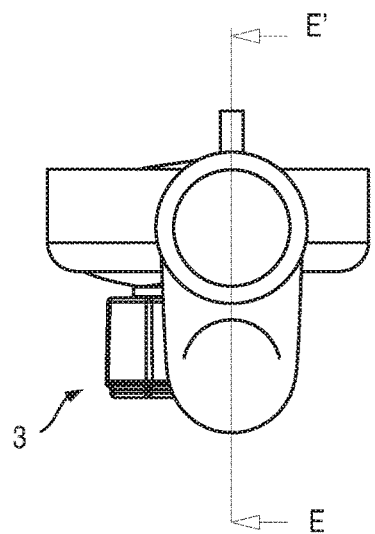
FIG. 26 is an end view of the centrifugal pump unit shown in FIG. 25.
Figure 27:
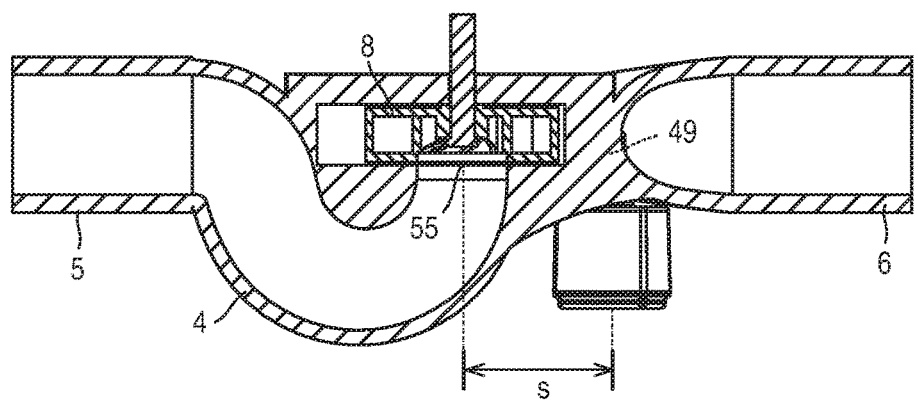
FIG. 27 is a section taken vertically through the centrifugal pump unit shown in FIG. 26 in the plane indicated by the line E-E'.
Figure 28:
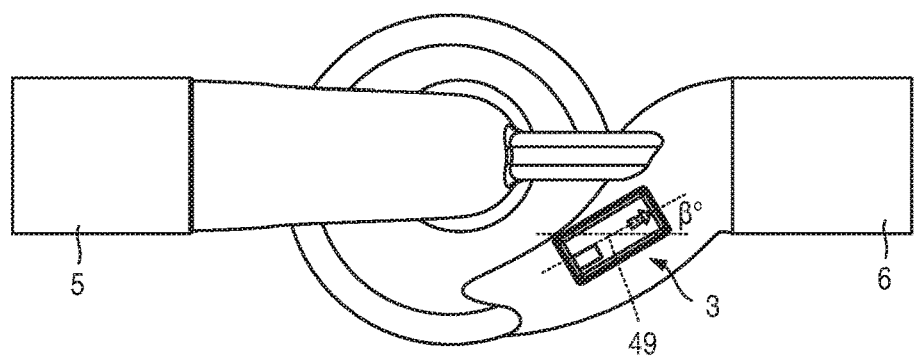
FIG. 28 is a top view of the centrifugal pump unit shown in FIG. 25.
Figure 33:
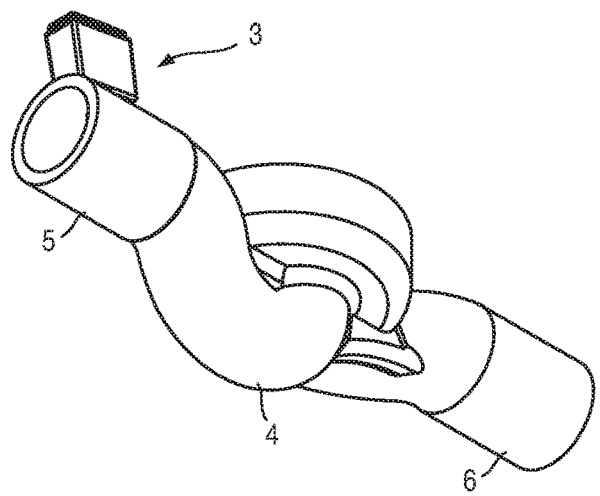
FIG. 33 is a perspective view of a tenth centrifugal pump unit.
Figure 34:
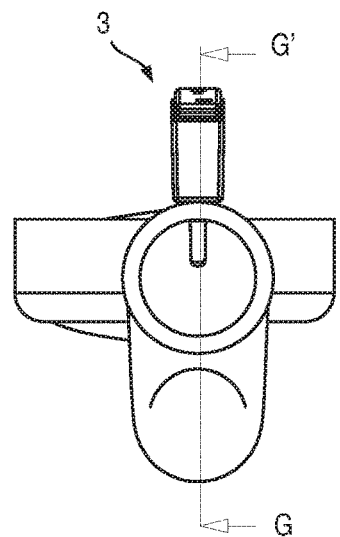
FIG. 34 is an end view of the centrifugal pump unit shown in FIG. 33.
Figure 35:
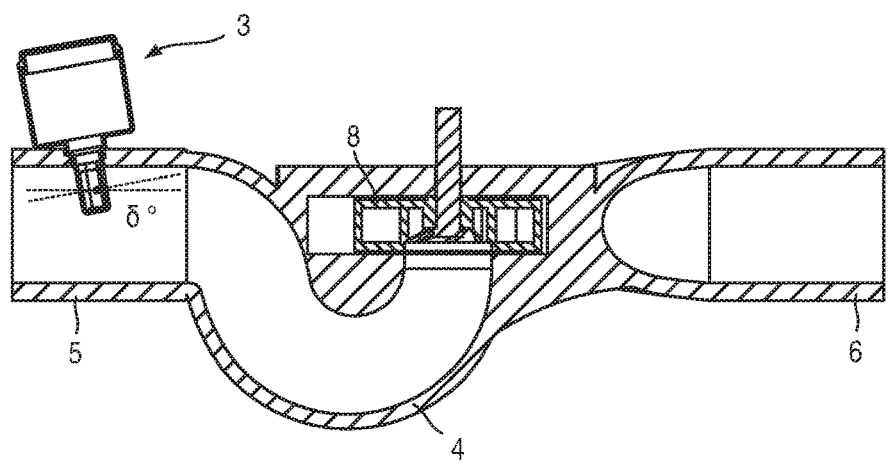
FIG. 35 is a section taken vertically through the centrifugal pump unit shown in FIG. 33 in the plane indicated by the line G-6'.
Figure 36:
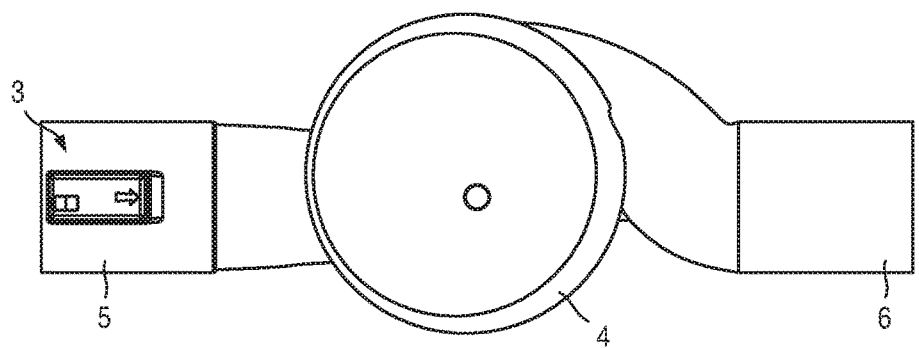
FIG. 36 is a top view of the centrifugal pump unit shown in FIG. 33.

FIGS. 22 to 24 show a centrifugal pump unit in which the sensor 3 is mounted in a part of the suction connection 5 which is inclined to the impeller axis 53 and at an angle α° to the face 54 of the impeller 8.

FIGS. 25 to 28 show a centrifugal pump unit in which the sensor 3 is mounted in a curved part of the pressure connection 6 which is not parallel to the output of the pressure connection 6 and is rotated by an angle β° about the sensor central axis with respect to the output of the pressure connection 6.

FIGS. 29 to 32 show a centrifugal pump unit in which the sensor 3 is mounted in the straight part of the suction connection 5 and is rotated (a "yaw") by an angle γ° about the sensor central axis. Such a rotation may be used if the flow in that part of the suction connection is not parallel to the straight part of the suction connection 5.

FIGS. 33 to 36 show a centrifugal pump unit in which the sensor 3 is mounted in the straight part of the suction connection 5 and is tilted (a "pitch") backward by an angle δ° with respect to the sensor central axis. Again, such tilt may be used if the flow in that part of the suction connection is not parallel to the straight part of the suction connection 5.

The flow sensors may be mounted at compound angles (a combination of circumferential and angled relative to the axis of the passage) as the flow direction in the vicinity of the sensor may not be parallel with the passage.

The invention is based, at least in part, on the insight that even though flow in the suction connection 5 or pressure connection 6 close to the impeller 8 may be highly complex, turbulent and involve re-circulation, an electromagnetic flow sensor 3 which measures velocity of conductive fluid in a localized region can still be used to measure flow in part of the connection 5, 6 in way that a flow rate through the pump 2 can be reliably determined. The sensor 3 can be located at a position where actual flow rate and measured velocity or flow rate exhibit a monotonic relationship, even a linear relationship. A suitable position for the pump can be found by computer simulation, specifically using computational fluid dynamics (CFD), and/or by experimenting by placing the sensor at different distances from the impeller 8 at different locations around the circumference of the connector. Suitable CFD software includes SolidWorks® Flow Simulation software, Autodesk® CFD software, ANSYS Discovery and COMSOL. The computed/measured flow rate can be compared with reference flow rate measured with a reference flowmeter (e.g., a full-bore flow meter) which is placed sufficiently far from the pump so that the reference flow rate is unaffected by turbulent flow. The method may comprise accepting a combination of insertion depth, angle and position if the computed/measured flow rate lies within 15%, within 10% or within 5% of the reference flow rate.

The method may comprise using computational fluid dynamics over a given range of flow rates to identify a candidate insertion depth and location for the electromagnetic flow sensor and using experiments using the electromagnetic flow sensor in the candidate insertion depth and location over the given range of flow rates to determine a calibration factor or calibration function.

Figure 37A:
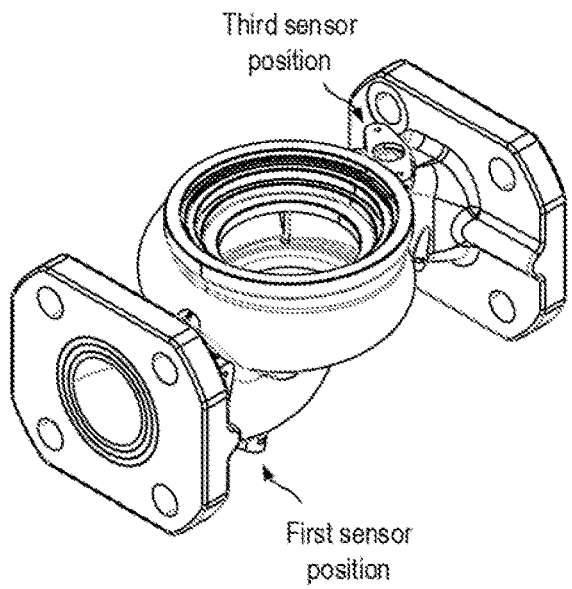
FIGS. 37(A) to 37(D) show perspective views of a test centrifugal pump body used for measuring pump head against flow rate illustrating different positions of sensors.
Figure 37B:
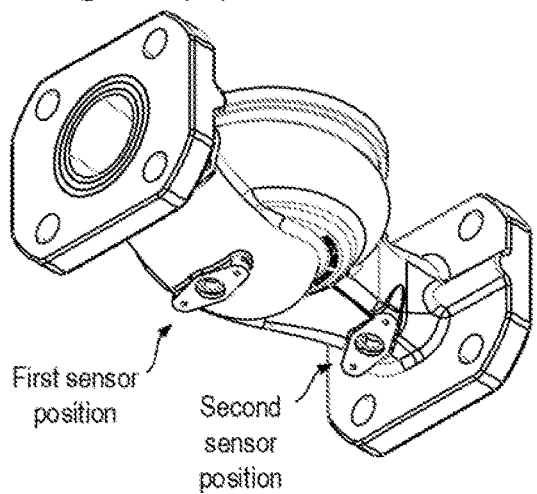
Figure 37C:
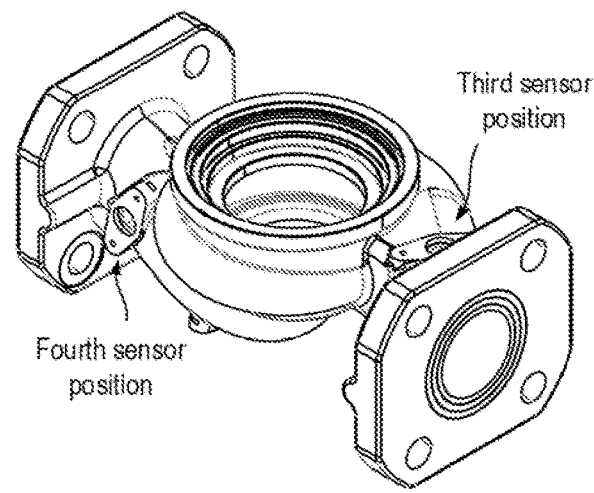
Figure 37D:
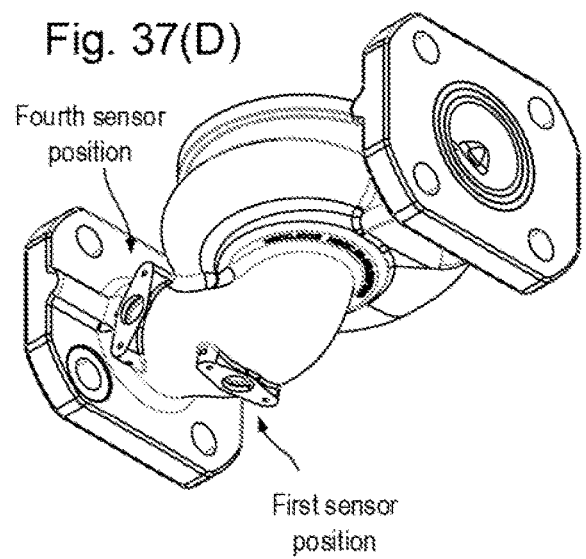

FIG. 37(A), Figure (B), Figure (C), and FIG. 37(D) show a test device having four different positions for sensors as set out in Table 1 below:

TABLE 1

| Label | Connection (Suction/Pressure) | Angular position |
| --- | --- | --- |
| First | Suction | Bottom |
| Second | Pressure | Bottom |
| Third | Pressure | Top |
| Fourth | Suction | Side |

Figure 38:
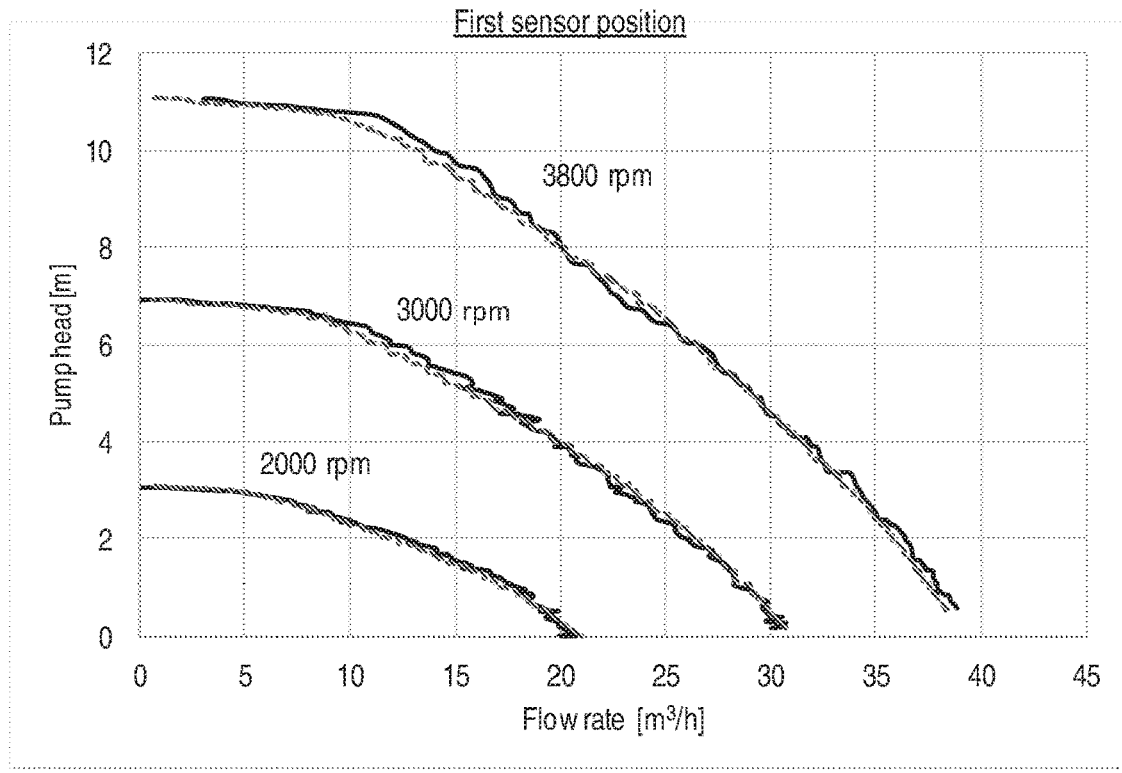
FIG. 38 shows measured plots of pump head against flow rate for three different speeds of impeller for a flow meter in a first position and for a reference flow meter arranged downstream of the centrifugal pump unit.

FIG. 38 shows plots of measured flow rate against head, at three different rotation speeds (2000, 3000 and 3800 rpm) for a sensor 3 located in a first position (the plots are shown as solid black lines) and for reference flow meter located far from the pump the plots are (shown as broken grey lines).

As can be seen from the plots, the sensor 3 in an integrated centrifugal pump unit 1 can be used to determine flow rate reliably and that it exhibits a monotonic relationship between actual flow rate and measured flow rate.

Figure 39:
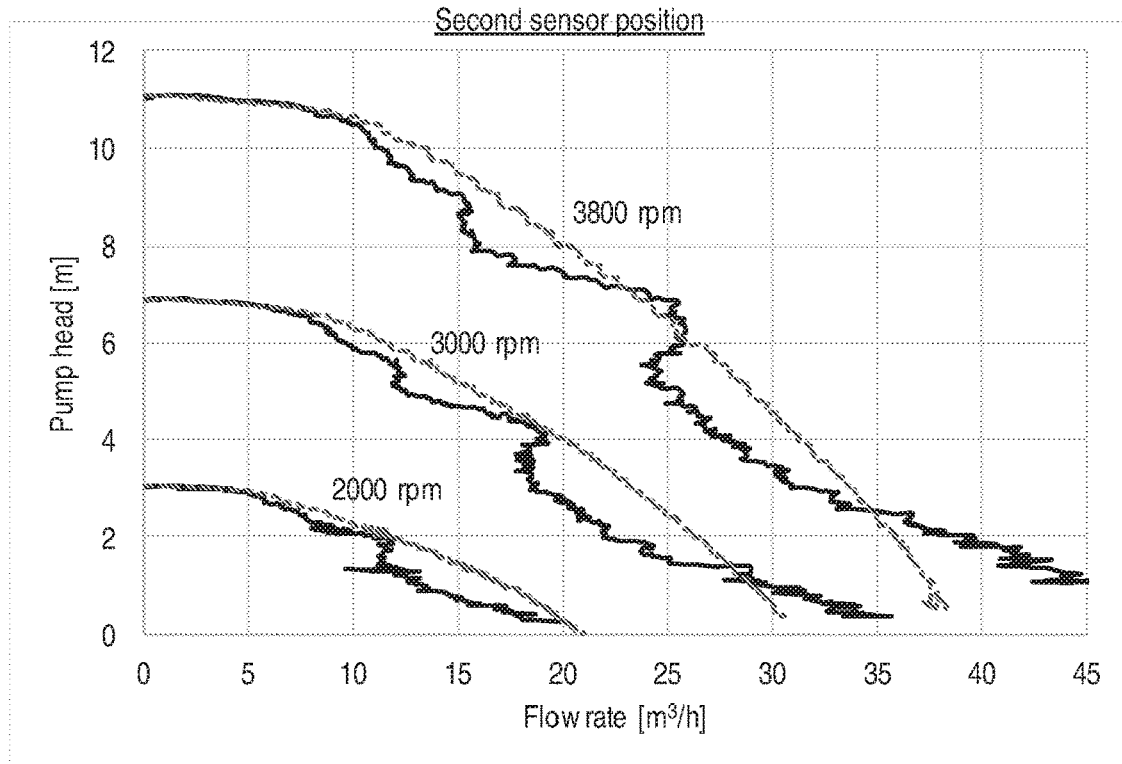
FIG. 39 shows measured plots of pump head against flow rate for three different speeds of impeller for a flow meter in a second position and for a reference flow meter arranged downstream of the centrifugal pump unit.
Figure 40:
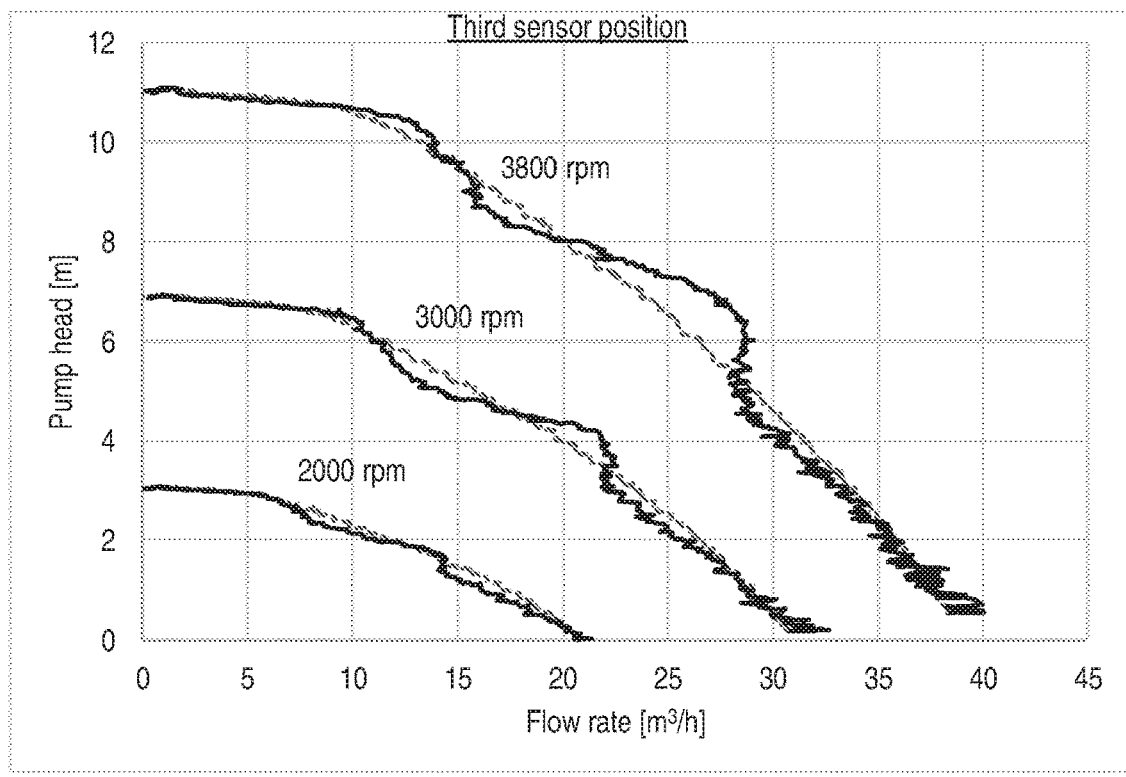
FIG. 40 shows measured plots of pump head against flow rate for three different speeds of impeller for a flow meter in a third position and for a reference flow meter arranged downstream of the centrifugal pump unit.
Figure 41:
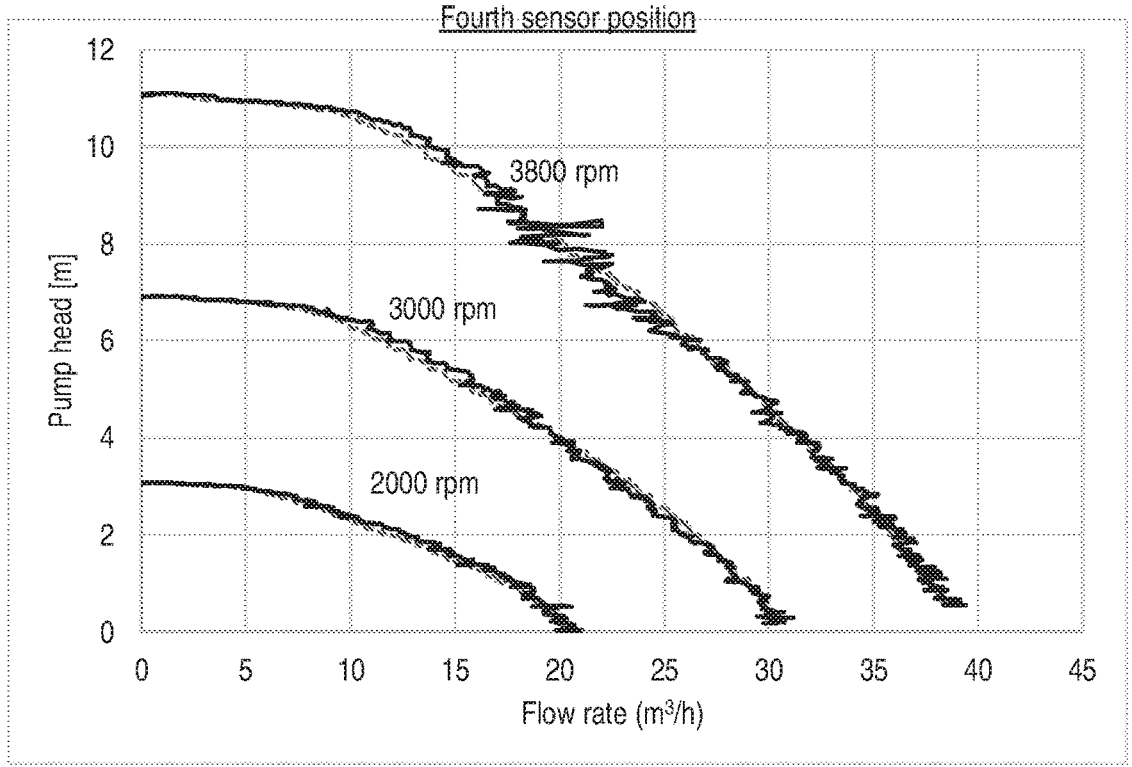
FIG. 41 shows measured plots of pump head against flow rate for three different speeds of impeller for a flow meter in a fourth position and for a reference flow meter arranged downstream of the centrifugal pump unit.

FIGS. 39, 40 and 41 shows plots of measured flow rate against head at three different rotation speeds (2000, 3000 and 3800 rpm) for a sensor 3 located in the second, third and fourth positions (the plots are shown as solid black lines) and for reference flow meter located far from the pump (the plots are shown as broken grey lines).

As can be seen from the plots, in some positions, the sensor 3 may be located at a position which does not exhibit a monotonic relationship between actual flow rate and measured flow rate.

It should be noted that the actual flow rate measured locally by the sensor 3 may not be equal to the flow rate through the pump 2 and that a multiplication factor (i.e., a calibration factor or a velocity-dependent calibration function) is used to determine the flow rate through the pump from the measured flow rate.

It should be noted that one size of flow sensor may be used in pumps of different sizes. Different calibration factors (functions) can be used for different sizes of pumps.

Figure 42:
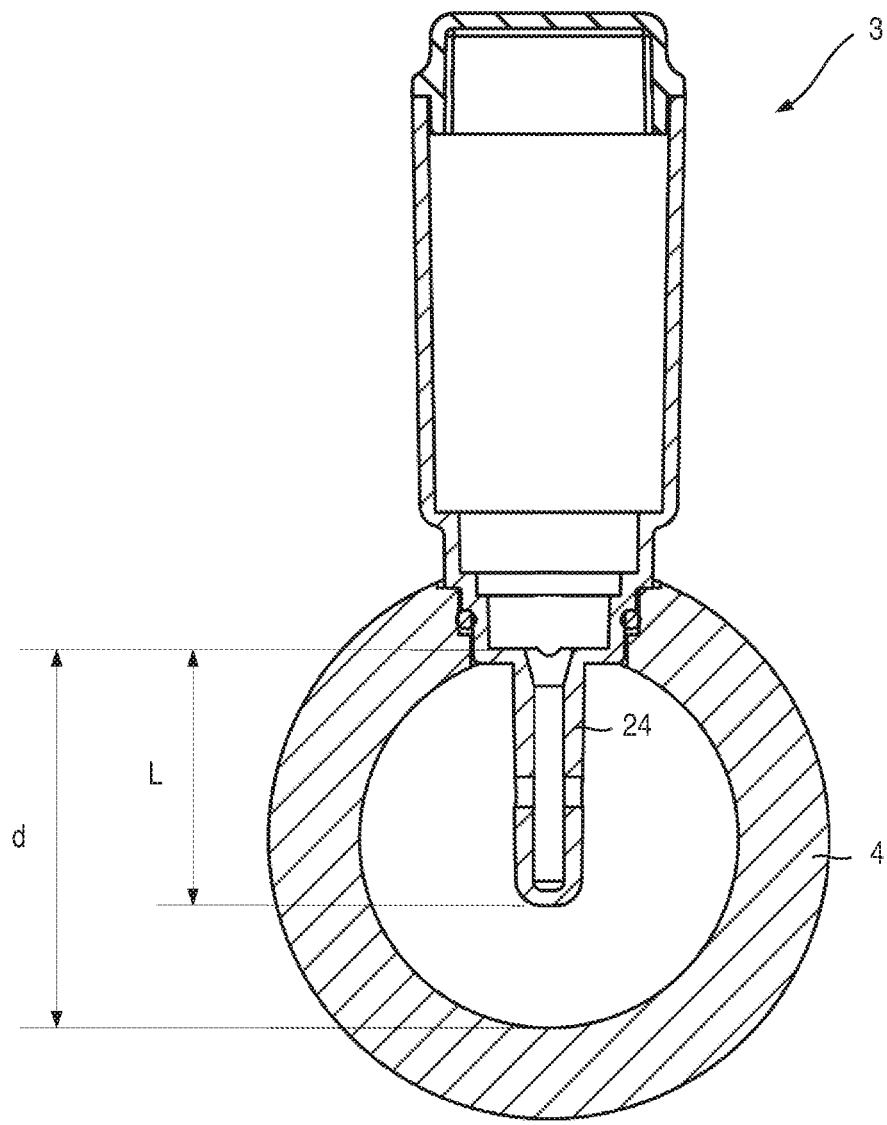
FIG. 42 is a transverse cross-section through a flow meter and tubular connection having a first inner pipe diameter.

Referring to FIG. 42, a flow sensor 3 is shown mounted to a relatively small pump body 4.

The vane 24 has a length L and the connection 5, 6 has an inner pipe diameter, d. In this case, the vane 24 protrudes over half the inner pipe diameter, d (i.e., L>0.5 d) and can protrude to almost the full pipe diameter where the vane length L many be up to, for example, 95% of the pipe diameter (i.e., L≤0.95 d).

Figure 43:
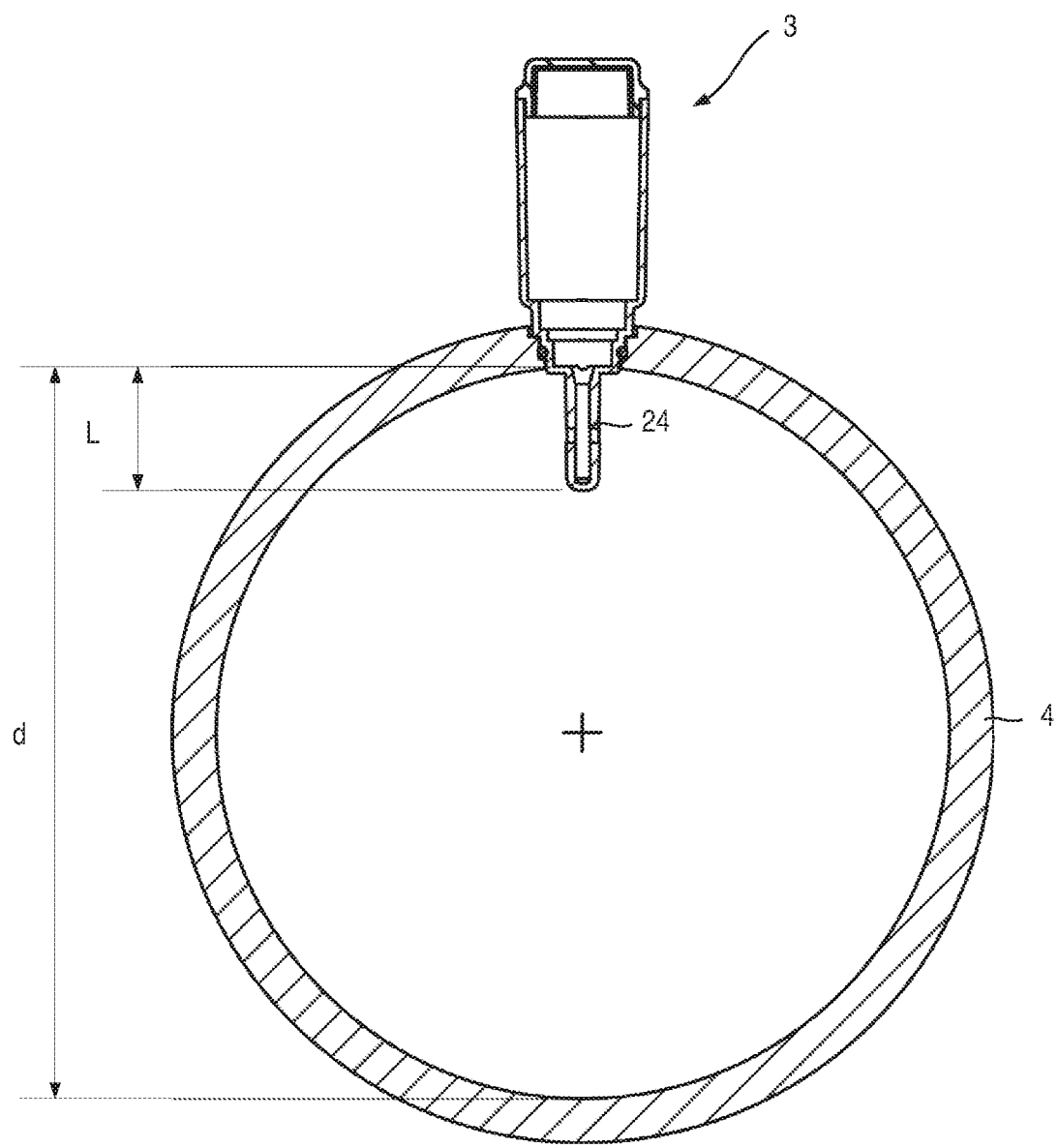
FIG. 43 is a transverse cross-section through a flow meter and tubular connection having a second inner pipe diameter.

Referring to FIG. 43, a flow sensor 3 is shown mounted to a relatively large pump body 4.

In this case, the vane 24 protrudes less than half the inner pipe diameter, d (i.e., L<0.5 d) and the vane length L many be up to, for example, 5% of the pipe diameter (i.e., L≤0.05 d).

The flow sensor 3 may be configured such that information about the pipe diameter is set (e.g., using a set of switches) or programmed (e.g., via an interface) such that it outputs a flow rate according to the pipe diameter.

Figure 44:
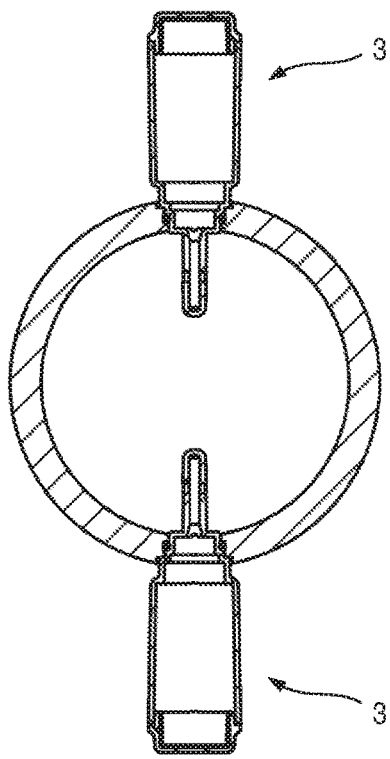
FIG. 44 is a transverse cross-section through a first multiple flow meter arrangement comprising two flow meters.
Figure 45:
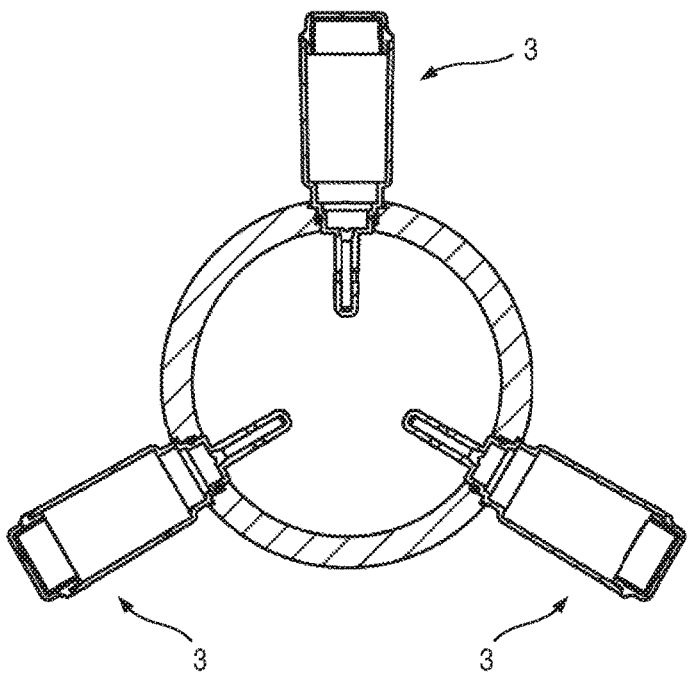
FIG. 45 is a transverse cross-section through a second multiple flow meter arrangement comprising three flow meters.
Figure 46:
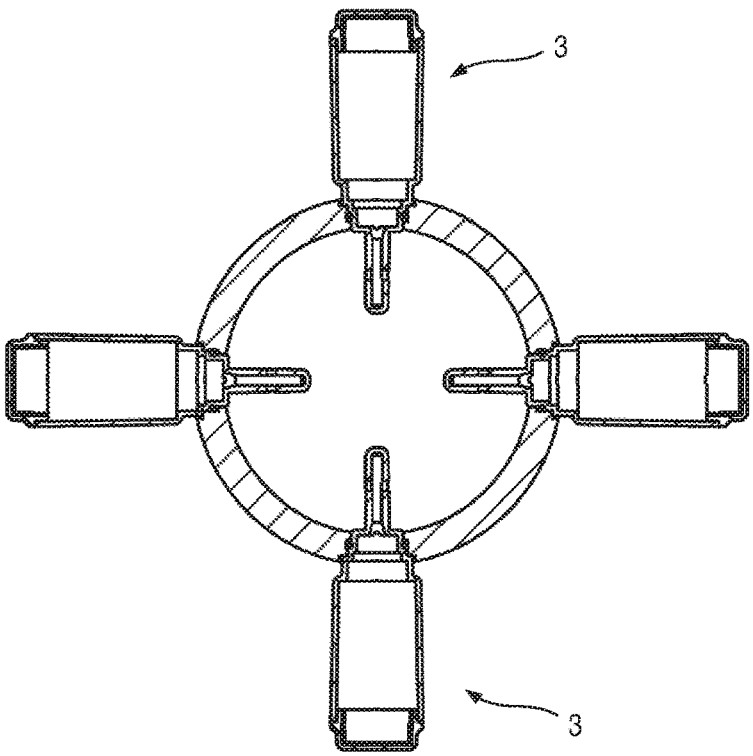
FIG. 46 is a transverse cross-section through a third multiple flow meter arrangement comprising four flow meters.

Referring to FIGS. 44, 45 and 46, more than one flow sensor 3 may be inserted into the pump body 4 at the same longitudinal position, but at different (e.g., equally spaced) angular positions about a longitudinal axis.

Referring again to FIG. 5, the electromagnetic flow sensor 3 can be one which protrudes into the lumen 17 of the pump 3. The flow sensor 3, however, can be mounted so as to be flush with inner wall 16.

Figure 47:
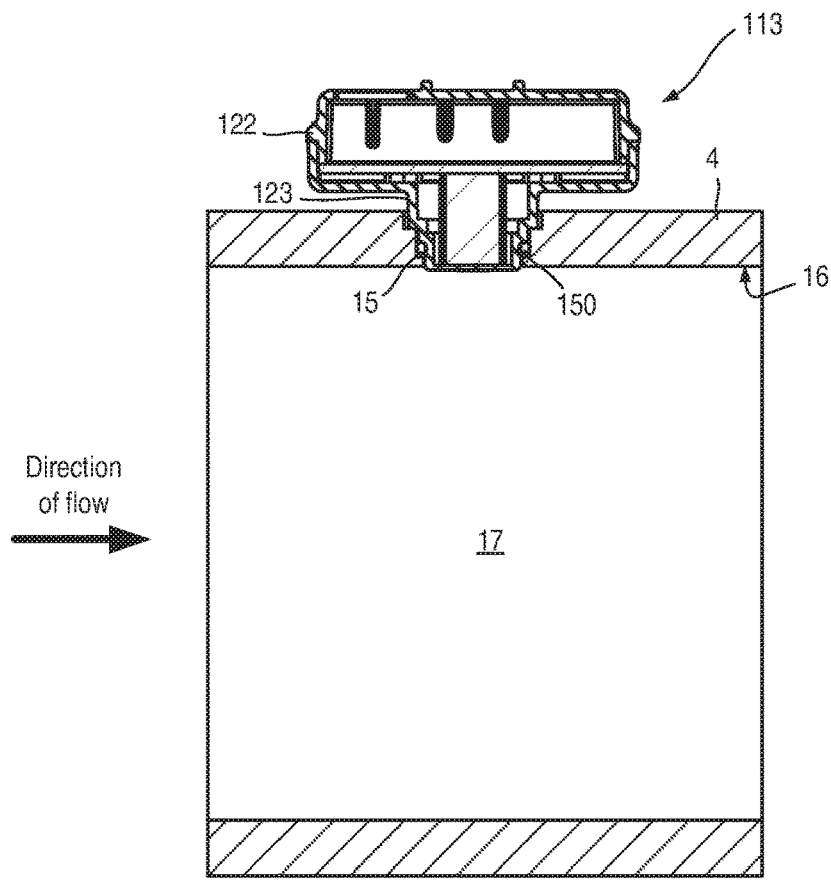
FIG. 47 is a longitudinal section taken vertically through a flush-type flow meter.
Figure 48:
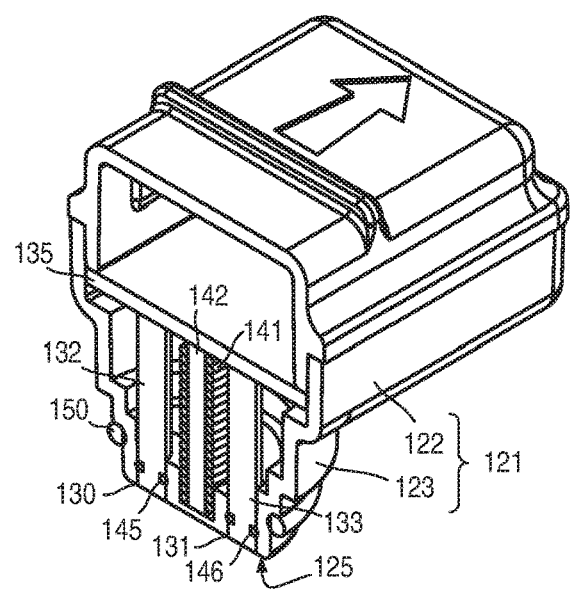
FIG. 48 is a perspective section taken vertically through the flush-type flow meter.

Referring to FIGS. 47 and 48, a second type ("flush type") of electromagnetic flow sensor 113 is shown.

As with the first type (insert type) of electromagnetic flow sensor 3, the flush type of sensor 113 can be manufactured separately from the rest of the pump 2 (FIG. 1) and then inserted into an aperture 15 in a part of the pump body, such as the pressure connection 6. However, the flow sensor 3 can be mounted so that as to be flush with inner wall 16 (FIG. 5).

The flow sensor 113 comprises a housing 121 formed of a plastics material. The housing 121 includes a generally box-like main portion 122 and a short, stepped, tubular portion 123, provided on one face of the main portion 122, for engaging with and providing a seal to the pump body 4, extending away from the main portion 122. The tubular portion 123 has a distal end 125 which, when the flow sensor is fitted, sits flush with the inner wall 16.

The housing 121 contains a printed circuit board assembly which comprises a printed circuit board 135. The printed circuit board 135 carries, depending from an underside of the printed circuit board 135, a drive coil 141 supported on a cylindrical core 142. The core 142 may consist of, for example, a soft magnetic material or ceramic.

The printed circuit board 135 also carries, either side of the drive coil 141 and also depending from the underside of the printed circuit board 135, first and second elongate electrodes 132, 133. The electrodes 132, 133 may take the form of metal bars or pins. The electrodes 132, 133 extend to the distal end 125 of the tubular portion 123 of the housing 121 which has respective apertures 130, 131 to expose the electrodes 132, 133 so that they can directly contact a fluid F whose velocity is being measured, from which a volumetric flow rate can be determined. The electrodes 132, 133 include an annular recess close to their respective distal ends to accommodate respective annular seals 145, 146, to prevent ingress of fluid into the inside of the housing 121.

The flush type of electromagnetic flow sensor 113 can be used instead of the insert type electromagnetic flow sensor 3 (FIG. 2) hereinbefore described and may be positioned in the suction connection 5 (FIG. 1) or pressure connection 6 as hereinbefore described.

Figure 49:
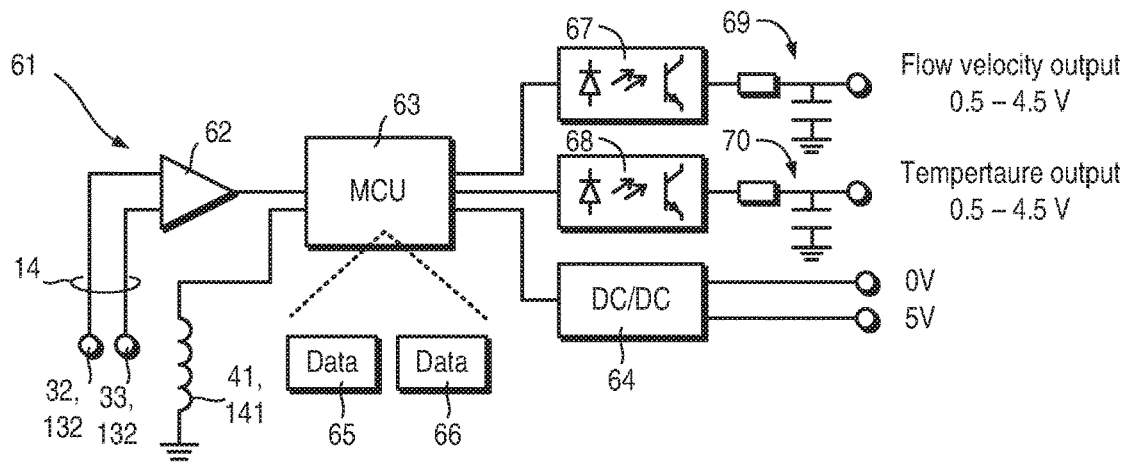
FIG. 49 is schematic block diagram of a flow meter electronic circuit.

Referring to FIG. 49, a schematic block diagram of sensor electronics 61 for processing signals 14 from the electrodes 32, 33, 132, 133 and driving the coil 41, 141 is shown. The sensor electronics 61 can be integrated in the sensor 3 or can be part of the pump electronics. If integrated in the sensor 3, 113, then the sensor electronics 61 may be housed in the main housing portion 22 of the sensor 3, 113.

The sensor electronics 61 includes a differential amplifier 62 which receives and amplifies signals from the electrodes 32, 33 and a microcontroller 63 which receives and processes the amplified signals and provides a drive waveform for the coil 41 for generating a magnetic field. The microcontroller 63 is powered from an external source, namely the pump drive, via a dc-dc converter 64.

The microcontroller 64 can store data such as compensation data 65 and/or H-Q curve data 66 for outputting a flow velocity signal dependent on the electrode signal values and, optionally, a temperature signal which may be measured using a temperature sensor (not shown). The signal(s) are supplied via opto-isolators 67, 68 and respective low-pass filters 69, 70 (e.g., in the form of RC low-pass filters).

A calibration factor can be applied to convert the sensor output from a velocity to volumetric flow rate Q. If the output of the sensor is linear, then a single calibration factor, with or without a zero offset, can be used. However, if the output is non linear, then a calibration function can be used. The calibration factor (or function) may be specific for a given pump of for pumps of a given size.

The output from the flow sensor(s) 3 can be used to directly control the pump 2 and, in some cases, no flow rate is calculated or output. Thus, the sensor can be used not necessarily to provide a flow rate (e.g. for display or as an input to a controller or computer system) but simply to provide pump control to improve energy efficiency and operate at the best efficiency point of the pump or the most efficient operating point of the system within which it is integrated.

The flow sensor 3, 113 can be used to determine a flow rate Q which, in turn, can be used to control the rotational speed of the motor 9 (FIG. 1) and, thus, the head, H. Control may be based on controlling head or flow error.

Figure 50:
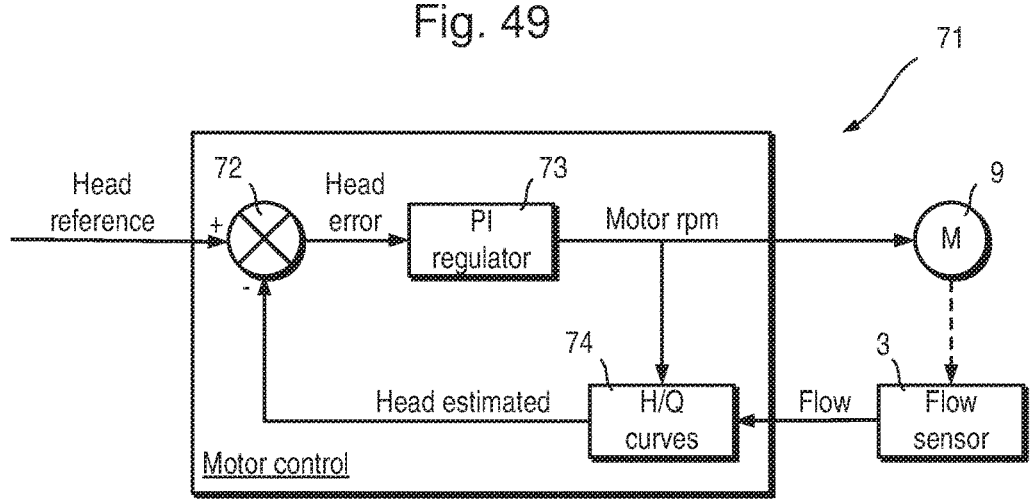
FIG. 50 is a schematic block diagram of a first control system for a pump in which flow rate output from a flow sensor is used as an input for motor control.

Referring to FIG. 50, a first control system 71 (or "scheme") is shown.

In the first control system 71, control is based on head.

The control system 71 includes an subtractor 72 for taking the difference between a head reference value and an estimated head value and outputting a head error value, and a proportional-integral controller 73 which receives the head error value and outputs a rotational speed which is fed to a driver (not shown) for the motor 9. The rotation speed is also fed to an H-Q curve calculator 74. The H-Q curve calculator 74 uses the value of flow Q, measured by the flow meter 3 and the rotation speed to calculate the estimated head value which is fed to the subtractor 72.

Figure 51:
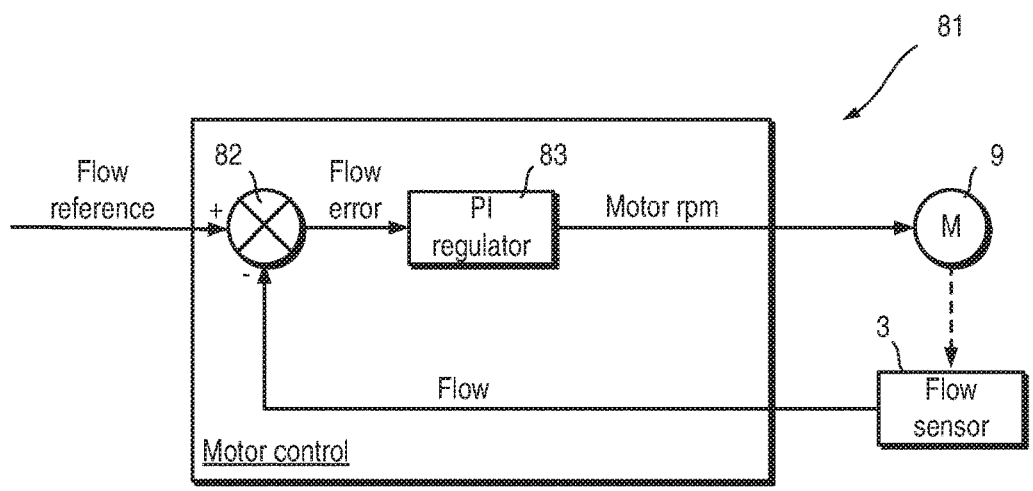
FIG. 51 is a schematic block diagram of a second control system for a pump in which flow rate output from a flow sensor is used as an input for motor control.

Referring to FIG. 51, a second control system 81 is shown.

In the second control system 81, control is based on flow.

The control system 81 includes a subtractor 82 for taking the difference between a flow reference value and measured flow value and outputting a flow error value, and a proportional-integral controller 83 which receives the flow error value and outputs a rotational speed which is fed to a driver (not shown) for the motor 9. The value of flow Q measured by the flow meter 3 is fed to the subtractor 82.

Modifications

It will be appreciated that various modifications may be made to the embodiments hereinbefore described. Such modifications may involve equivalent and other features which are already known in the design, manufacture and use of centrifugal pumps and electromagnetic flow meters and component parts thereof and which may be used instead of or in addition to features already described herein. Features of one embodiment may be replaced or supplemented by features of another embodiment.

In the vicinity of the point where the electromagnetic flow sensor is inserted, the pump casing may be thickened to allow it still to meet pump pressure extremes and/or to enable the housing of seals associated with the sensor Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A centrifugal pump unit comprising:
   a body which comprises:
   a suction connection;
   a pressure connection; and
   a pump chamber connecting the suction connection and the pressure connection;
   an impeller disposed in the pump chamber; and
   one or more electromagnetic flow sensors, each electromagnetic flow sensor omitting a flow conditioner and arranged to measure flow in at least a part of the suction connection, the pressure connection, and the pump chamber for determining a flow rate of a fluid through the centrifugal pump unit,
   wherein each electromagnetic flow sensor is:
   an insert-type sensor inserted through an aperture of a respective part of the body and comprising:
      a sealing portion engaging with and providing a seal to the respective part of the body;
      an elongated vane extending from the sealing portion in a first direction to a distal end disposed within the respective part of the body, the vane comprising a front face, a back end, a first side wall and a second side such that flow is diverted around the vane comprising:
         a first electrode exposed by a first aperture in the first side wall;
         a second electrode exposed by a second aperture in the second side wall; and
         a drive coil which is self-supporting or wound about a core, the drive coil arranged to generate a dipole magnetic field oriented along the first direction in order to generate a voltage between the first and second electrodes in response to flow of conductive fluid through the dipole magnetic field;
      wherein the drive coil is disposed between the first and second side walls.

2. The centrifugal pump unit of claim 1:
   wherein the impeller has an eye diameter and an impeller axis;
   wherein each electromagnetic flow sensor has an electrode midpoint between the first and second electrodes; and
   wherein the electrode midpoint is disposed such that a separation, s, between the impeller axis and the electrode midpoint is less than or equal to ten times the eye diameter; and wherein s is measured in any radial direction about the impeller axis.

3. The centrifugal pump unit of claim 1:
   wherein the impeller has an eye diameter, an impeller axis and an impeller suction-side face defining a plane;
   wherein each electromagnetic flow sensor has an electrode midpoint between the first electrode and the second electrode; and
   wherein the electrode midpoint in the suction connection is disposed such that the separation, s, between the electrode midpoint and an intersection of the impeller axis and the plane of the suction-side face is less than or equal to ten times the impeller eye diameter.

4. The centrifugal pump unit of claim 1, wherein each of the one or more electromagnetic flow sensors is removably attachable to or insertable into the body.

5. The centrifugal pump unit of claim 1, further comprising:
   a controller configured to receive a measured voltage signal from the one or more electromagnetic flow sensors and to provide an output signal or signal value dependent on the measured voltage signal indicative of the flow rate of the fluid through the centrifugal pump unit.

6. The centrifugal pump unit of claim 5, wherein the controller is configured to correct the measured voltage signal, the output signal, the signal dependent on the measured voltage signal, or an intermediate signal between the measured voltage signal, the output signal, and the signal dependent on the measured voltage signal using:
   a pump speed, a motor load, or both; or
   an operating point with respect to a best efficiency point of the pump.

7. The centrifugal pump unit of claim 5, wherein the controller is configured:
   to receive or to store data indicative of a tube diameter for the suction or pressure connection; and
   to compute the output signal or the signal value dependent on the measured voltage signal in dependence on the tube diameter and a pre-defined relationship between the tube diameter and volumetric flow rate, Q.

8. The centrifugal pump unit of claim 5, wherein the controller is configured:
   to receive or to store a correction value; and
   to compute the output signal or the signal value in dependence on the correction value and a pre-defined relationship between a diameter of a lumen of the centrifugal pump unit and volumetric flow rate, Q.

9. The centrifugal pump unit of claim 5, wherein at least one of the one or more electromagnetic flow sensors includes a temperature sensor for providing temperature data.

10. The centrifugal pump unit of claim 9, wherein the controller is configured to use the temperature data to correct for thermal dependence of flow sensor gain, offset, or both.

11. The centrifugal pump unit of claim 9, wherein the controller is configured to provide the output signal or the signal value dependent at least in part on the temperature data.

12. The centrifugal pump unit of claim 9, further comprising at least two electromagnetic flow sensors provided at different positions on the pump body, each electromagnetic flow sensor providing a respective voltage signal, wherein the controller is configured to compute a volumetric flow rate using the respective voltage signal provided by each electromagnetic flow sensor.

13. The centrifugal pump unit of claim 1, wherein each of the one or more electromagnetic flow sensors is arranged within the body of the pump such that each electromagnetic flow sensor measures flow in a region which exhibits a monotonic relationship, over a least part of a flow range of the pump, between measured flow and actual flow rate.

14. The centrifugal pump unit of claim 1, wherein each of the one or more electromagnetic flow sensors has an orientation and a position with respect to a lumen of the centrifugal pump unit such that each electromagnetic flow sensor measures flow in a region which exhibits a monotonic relationship, over a least part of the flow range of the centrifugal pump unit, between measured flow and actual flow rate.

15. The centrifugal pump unit of claim 1, wherein a cross section of a lumen of the pump body is larger at a first position where the one or more electromagnetic flow sensors is inserted than a second position on either side of the first position.

16. The centrifugal pump unit of claim 1, wherein:
   in a case where an electromagnetic flow sensor of the one or more electromagnetic flow sensors is arranged to measure velocity of conductive fluid in the localized region of the lumen of the suction connection, a cross-sectional area of the localized region corresponding to that electromagnetic flow sensor is less than the lumen of the suction connection; and
   in a case where an electromagnetic flow sensor of the at least one electromagnetic flow sensors is arranged to measure velocity of conductive fluid in the localized region of the lumen of the pressure connection, a cross-sectional area of the localized region corresponding to that electromagnetic flow sensor is less than the lumen of the pressure connection.

17. The centrifugal pump unit of claim 1, wherein each vane protrudes past an inner wall and into the lumen of the suction connection or the lumen of the pressure connection.

18. A temperature-regulating system comprising a fluid circuit which includes at least one a heat source, at least one heat sink, and at least one centrifugal pump unit according to claim 1 arranged to pump fluid around the fluid circuit.

19. A fluid-handling system comprising a fluid path between a fluid source, a fluid sink, and at least one centrifugal pump unit according to claim 1 arranged to pump fluid along the fluid path.

* * * * *